United States Patent [19]

Lipner et al.

[11] Patent Number: 5,557,765
[45] Date of Patent: Sep. 17, 1996

[54] SYSTEM AND METHOD FOR DATA RECOVERY

[75] Inventors: Steven B. Lipner, Oakton, Va.; David M. Balenson, Olney, Md.; Carl M. Ellison, Baltimore, Md.; Stephen T. Walker, Glenwood, Md.

[73] Assignee: Trusted Information Systems, Inc., Glenwood, Md.

[21] Appl. No.: 390,959

[22] Filed: Feb. 21, 1995

Related U.S. Application Data

[63] Continuation-in-part of Ser. No. 289,602, Aug. 11, 1994.

[51] Int. Cl.$^6$ .................. H04L 9/08; H04L 9/30
[52] U.S. Cl. .................. 380/21; 380/25; 380/30
[58] Field of Search .................. 380/4, 25, 30, 380/21

[56] References Cited

U.S. PATENT DOCUMENTS

| | | | |
|---|---|---|---|
| 4,590,470 | 5/1986 | Koenig | 380/25 |
| 4,926,480 | 5/1990 | Chaum | 380/30 |
| 4,947,430 | 8/1990 | Chaum | 380/25 |
| 4,996,711 | 2/1991 | Chaum | 380/30 |
| 5,191,611 | 3/1993 | Lang | 380/25 |
| 5,224,163 | 6/1993 | Gasser et al. | 380/25 |
| 5,263,157 | 11/1993 | Janis | 380/4 |
| 5,267,313 | 11/1993 | Hirata | 380/21 |
| 5,276,736 | 1/1994 | Chaum | 380/25 |
| 5,276,737 | 1/1994 | Micali | 380/30 |
| 5,276,901 | 1/1994 | Howell et al. | |
| 5,299,263 | 3/1994 | Beller et al. | 380/30 |
| 5,313,637 | 5/1994 | Rose | 380/4 |
| 5,315,658 | 5/1994 | Micali | 380/30 |
| 5,347,578 | 9/1994 | Duxbury | 380/4 |
| 5,351,293 | 9/1994 | Michener et al. | 380/21 |
| 5,371,794 | 12/1994 | Diffie et al. | 380/21 |
| 5,406,628 | 4/1995 | Beller et al. | 380/21 |
| 5,436,972 | 7/1995 | Fischer | 380/25 |

FOREIGN PATENT DOCUMENTS

| | | |
|---|---|---|
| 0493232 | 7/1992 | European Pat. Off. . |
| WO93/21708 | 10/1993 | WIPO . |

OTHER PUBLICATIONS

Maher, David P., *CryptoBackup and key escrow*, AT&T Bell Labs Dept. D10083000, Oct. 1994, pp. 1–7. <Proprietary> Material Not Open to Public, to be Opened Only by Examiner or Other Authorized Patent and Trademark Office Employee.

Maher David P., "Trust in the New Information Age", *AT&T Technical Journal*, Sep./Oct. 1994, vol. 73, No. 5, Security Technologies, pp. 9–16.

"Fair Cryptosystems" Micali, S., Aug. 11, 1993.

"Draft Proposed Escrowed Encryption Standard", Branstad et al., viewgraphs presented at Computer Security and Privacy Meeting, Mar. 1994.

(List continued on next page.)

*Primary Examiner*—Salvatore Cangialosi
*Attorney, Agent, or Firm*—Sterne, Kessler, Goldstein & Fox P.L.L.C.

[57] ABSTRACT

A system and method for dam escrow cryptography are described. An encrypting user encrypts a message using a secret storage key (KS) and attaches a data recovery field (DRF), including an access rule index (ARI) and KS, to the encrypted message. The DRF and the encrypted message are stored in a storage device. To recover KS, a decrypting user extracts and sends the DRF to a data recovery center (DRC) that issues a challenge based on access rules (ARs) originally defined by the encrypting user. If the decrypting user meets the challenge, the DRC sends KS in a message to the decrypting user. Generally, KS need not be an encryption key but could represent any piece of confidential information that can fit inside the DRF. In all cases, the DRC limits access to decrypting users who can meet the challenge defined in either the ARs defined by the encrypting user or the ARs defined for override access.

68 Claims, 22 Drawing Sheets

OTHER PUBLICATIONS

"Protocol Failure in the Escrowed Encryption Standard", Blaze, M., presented on Internet, Jun. 3, 1994.

"Private Escrow Key Management", Key Escrow Encryption Workshop, Scheidt et al., paper distributed Jun. 10, 1994.

"A Solution for the International Community", TECSEC, Key Escrow Encryption Workshop, viewgraphs distributed Jun. 10, 1994.

"Private Escrow Key Management", TECSEC, Key Escrow Encryption Workshop, viewgraphs distrubuted Jun. 10, 1994.

"An Advanced Key Management System", TECSEC, Key Escrow Encryption Workshop, paper distributed Jun. 10, 1994.

"Key Escrowing Today", Denning et al., IEEE Communications, Sep. 1994.

"A Taxonomy for Key Encryption Systems", Denning et al., draft distributed Sep. 24, 1994.

L. Harn and H. Y. Lin, "Integration of user authentication and access control", *IEEE Proceedings–E,* vol. 139, No. 2, pp. 139–143, Mar. 1992.

Brickell et al., "Skipjack Review: Interim Report: The Skipjack Algorithm", *Georgetown University, Office of Public Affairs,* pp. 1–6, Jul., 28, 1993.

"Key Escrow Encryption: Does it Protect or Compromise User Interests?", Denning, D., Jan. 3, 1995.

"Observations about Key Escrow Alternatives", Denning, D., Jan. 2, 1995.

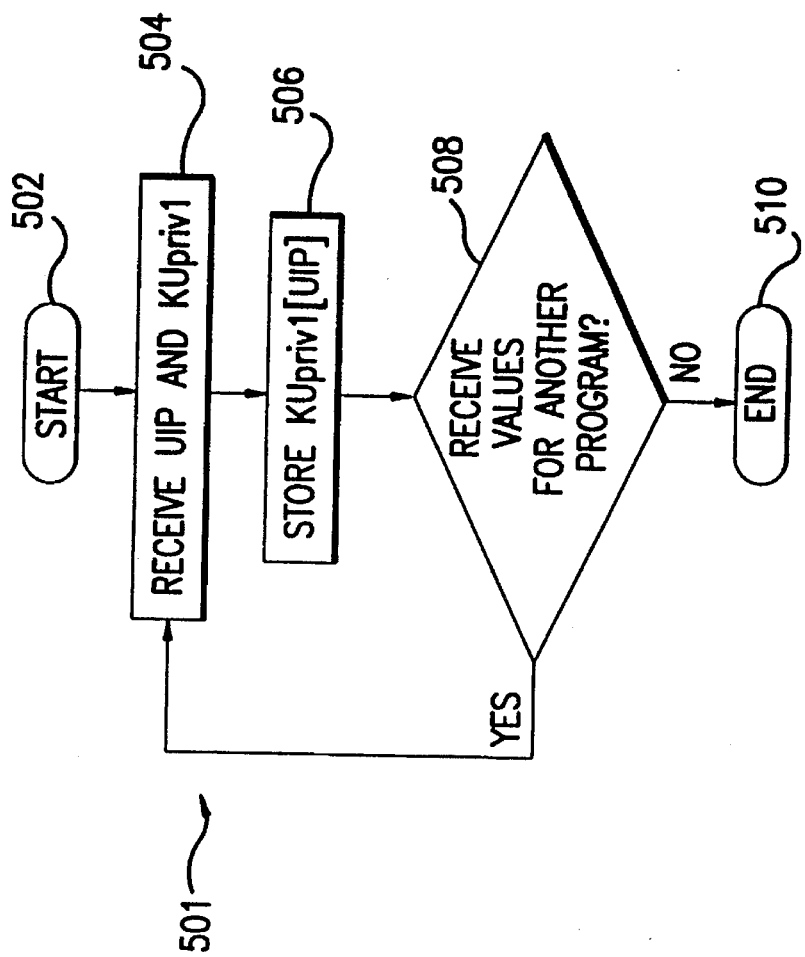
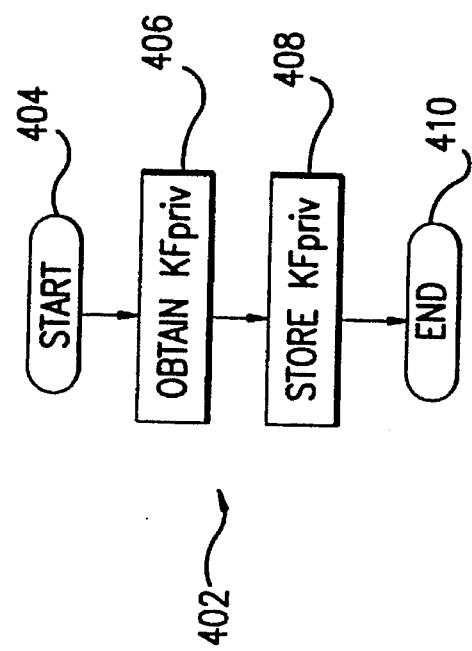
FIG. 5
FIG. 4

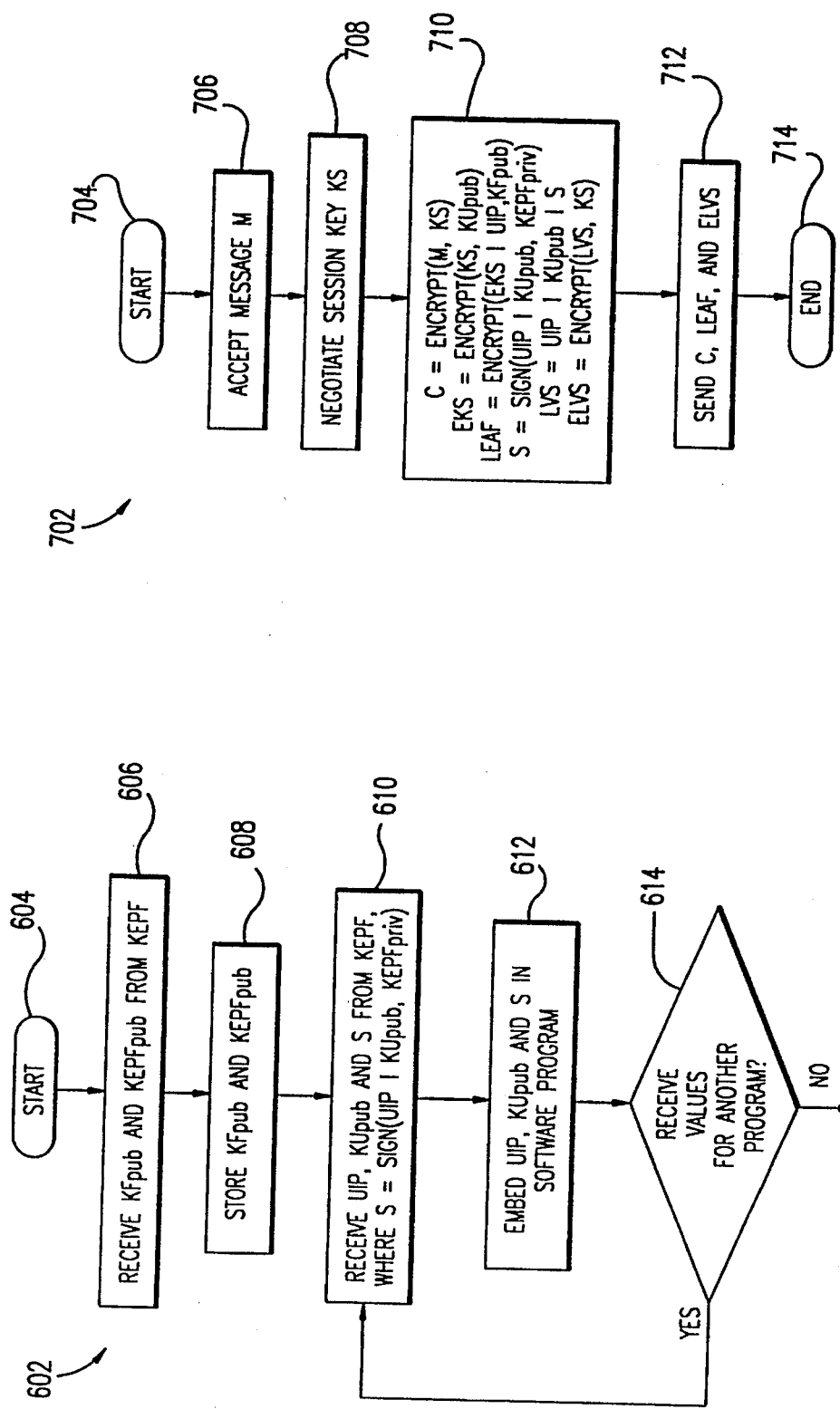

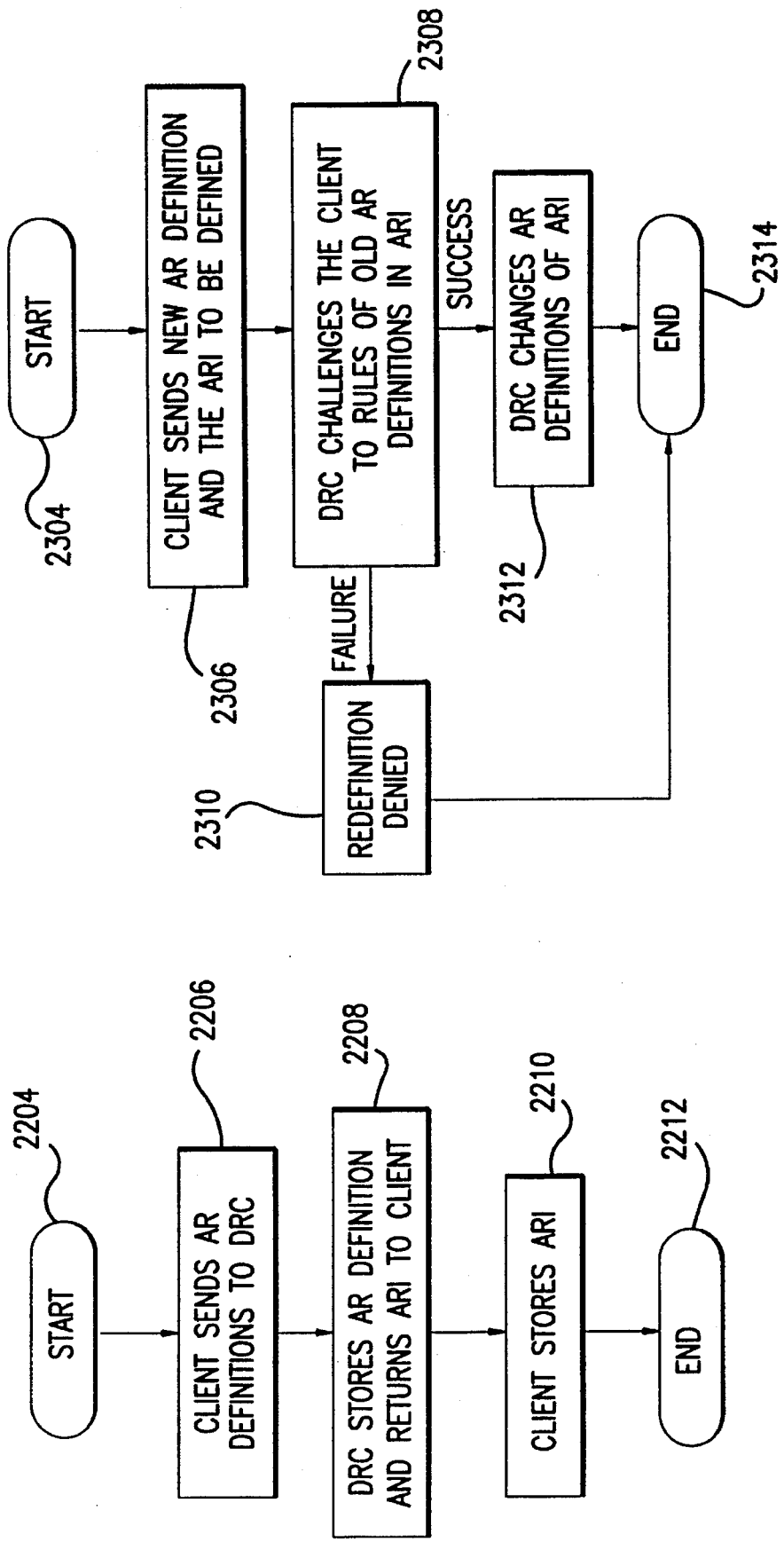

SYSTEM AND METHOD FOR DATA RECOVERY

This is a continuation-in-part of pending Application entitled "System And Method For Key Escrow Encryption", Ser. No. 08/289,602, filed on Aug. 11, 1994 pending.

BACKGROUND OF THE INVENTION

1. Field of the Invention

The present invention relates generally to data encryption, and more particularly to key escrow data encryption.

2. Related Art

Introduction

An United States Presidential announcement on Apr. 16, 1993, referred to as the "Clipper initiative," called for the development of a hardware implementation of a classified encryption algorithm called "Skipjack". The Presidential announcement characterized the Skipjack algorithm as being "significantly stronger than those currently available to the public." The hardware implementation of Skipjack would also include a capability called "key escrow" which allows the government to recover the keys used for data encryption. The integrated circuit chip which implements the Skipjack algorithm is called the "Clipper chip" and/or the "Capstone chip".

The Clipper initiative (particularly the key escrow feature) attempts to preserve the ability of law enforcement and national security to intercept and exploit the contents of communications while providing law-abiding citizens with an encryption system much stronger than any now available to them. The announcement of the Clipper initiative and the subsequent discussions made it clear that, while Skipjack is a stronger encryption algorithm than the current unclassified Data Encryption Standard (DES), law enforcement entities considered that the proliferation of DES voice security devices would be a significant impediment to their need to preserve the ability to accomplish court-ordered wiretaps.

A great deal of resistance to the Clipper initiative was evident in the public reaction to the Apr. 16 announcement. Objections were expressed in various forms, but the following key points stand out:

Many people objected to the potential for loss of privacy that would result from the deployment of key escrow cryptography and the associated sharing of heretofore private cryptographic keys with government escrow agents.

Many people raised objections to the Administration's attempt to use the buying power of the government to impose as de facto standards a family of encryption products that could be defeated at will by government agencies.

Some people objected to the introduction of a classified algorithm as the standard for the protection of unclassified information. DES is public and has had wide scrutiny in its fifteen year life. There were suggestions that Skipjack might have a defect or trap door (other than the key escrow process). These objections were not quieted by the favorable review of Skipjack by a panel of outside cryptographers.

Many people (especially suppliers of Information Technology products) objected to the requirement for a hardware implementation because of its cost and because of the limitations that the need to accommodate a government-designed chip imposes on overall system or product design.

In Aug. 1993, the National Institute of Standards and Technology (NIST) announced a cooperative program with industry to explore possible approaches to the implementation of key escrow in software (without the need for dedicated hardware components such as the Clipper or Capstone chips).

There are a number of issues that intertwine in any discussion of this topic. Such issues include hardware implementation, classified encryption algorithms, and how much trust one must put in the user of the encryption process. These issues are considered below. However, before addressing these issues, it will be useful to consider key escrow.

Key Escrow Cryptography

Key escrow adds to products that implement cryptography features that allow authorized parties to retrieve the keys for encrypted communications and then decrypt the communications using such keys. In the Clipper initiative, keys for each encryption device are mathematically divided into two halves (each equal in length to the original key) and the halves are held by two separate escrow agents. Both escrow agents must cooperate (to regenerate the original key) before the communications from a given device can be decrypted. For Clipper, the escrow agents are government agencies who require assurance that the law enforcement agency requesting the keys has a court order authorizing a wiretap for the communications in question.

A number of needs have been cited to justify key escrow cryptography. Some apply to the needs of law enforcement and national security, while others apply to the needs of individual users or organizations:

Law enforcement and national security agencies are concerned that growing use of encrypted communications will impair their ability to use court-ordered wiretapping to solve crimes and prevent acts of terrorism. Widespread use of key escrow cryptography would preserve this ability for these agencies, while providing the public with the benefits of good quality cryptography. In the case of law enforcement and national security, government escrow agents provide access to communications when authorized by a court order.

Some corporations have expressed a concern that careless or malicious mismanagement of keys by employees might deny the corporation access to its valuable information. Key escrow cryptography at the corporate level has been advocated as a mechanism by which such corporations might regain access to their information. In this sort of application, one might have senior management or personnel offices serve as escrow agents who would permit an employee's supervisor to gain access to his or her files or communications.

Individuals who use encryption for their own information may forget or lose the passwords that protect their encryption keys, die, or become incapacitated. Key escrow cryptography has been proposed as a safety mechanism for such individuals. In this case, an individual might select friends or attorneys as escrow agents who would allow the individual (or perhaps the executor of his or her estate) access to protected information.

In some cases, government agencies have the authority to monitor the business communications of their employees. Such authority applies, for example, in military and national security installations where it is used to detect the misuse of classified or sensitive information. Key escrow cryptography offers such agencies the opportunity to exercise their authority to monitor even for encrypted communications. In this application, communications security officers might serve as escrow agents who would grant access to line managers or commanders.

The Clipper initiative focuses on the first of the four applications for key escrow cited above. In addition, the Clipper initiative couples the introduction of key escrow with the introduction of Skipjack, a new classified encryption algorithm much stronger than the unclassified DES.

Opponents of the Clipper initiative have argued that a key escrow encryption system such as Clipper can be defeated by sophisticated users such as organized crime, who have the ability to write or buy their own encryption system (without key escrow) and either ignore the key escrow products altogether or encrypt first under their own system and then under the key escrow system. Other options are open to pairs of users who wish to cooperate to defeat key escrow, and some opponents of the Clipper initiative have suggested that the only way to deter such options is to forbid non-escrowed encryption by law and to enforce the law with a vigorous program of monitoring communications—an unappealing prospect to say the least.

Proponents of the Clipper initiative counter that they are well aware that pairs of cooperating users have many ways to avoid key escrow. The objective that these proponents cite is to make it difficult or impossible for a single "rogue" user to communicate securely with parties (or more precisely with escrowed encryption devices) that believe they are engaged in a communication where both communicants are faithfully following the escrow rules.

The "single rogue user" scenario constitutes a test for a key escrow system. A successful key escrow system (hardware or software) should prevent a single rogue user from exploiting the cryptography in the escrowed product, and from defeating or bypassing the product's key escrow features, while still enabling secure communication with other users (products) that believe that they and the rogue user are implementing the escrow features correctly.

The "Clipper" chip addresses the "single rogue user" by embedding the key for each individual communication session in a Law Enforcement Access Field (LEAF) that is encrypted under a secret key (the Family Key) that is common to all "Clipper" chips. the embedded information includes a checksum that depends on the session key. The receiving "Clipper" chip also holds the Family Key; thus, it can decrypt the LEAF and verify that the checksum is the correct one for the current session key (which both chips must share in private for communication to be successful and secure). All "Clipper" chips share the embedded Family Key and rely on the temperproof hardware of the chip to protect the Family key from disclosure.

Hardware Implementation of Key Escrow Cryptography

There are several factors that support the decision to require the use of separate hardware in the design of the key escrow products proposed as part of the Clipper initiative (Clipper and Capstone chips). Some of these factors, discussed below, are related to the introduction of key escrow cryptography, some to the use of a classified encryption algorithm, and some to the choice of a conservative standard for the design of encryption products.

Separate hardware provides a degree of protection for the encryption process difficult to obtain in software systems. An errant or malicious computer program can not corrupt the encryption algorithm or key management embedded in a hardware encryption device such as the Clipper or Capstone chip.

Separate hardware provides a degree of protection for the key escrow process difficult to obtain in software systems. While software can manipulate the externally visible parameters of the escrow process, hardware at least provides some assurance that the escrow operations are performed or verified.

If a classified encryption algorithm such as Skipjack is used, separate hardware that implements special protective measures may be essential to protect the design of the algorithm from disclosure.

Secret cryptographic keys can be provided with a high degree of protection on a hardware device since unencrypted keys need never appear outside the device. In contrast, it is difficult or even impossible to protect secret keys embedded in software from users with physical control of the underlying computer hardware.

Proliferation of an encryption capability is perceived to be easier to control with respect to accounting for controlled devices and restriction of exports with hardware devices than with embedded software.

The list above makes it clear that some of the need for hardware in the Clipper initiative derives from a need to protect the classified Skipjack algorithm, some from conservative design of the encryption system, and some from a need to protect the escrow process.

Use of a Classified Data Encryption Algorithm

The Skipjack encryption algorithm that was introduced with the Clipper initiative is claimed to be much stronger than existing publicly available algorithms such as DES. Having a strong algorithm is a valuable selling point for any new encryption initiative. But, as the discussion above pointed out, protecting a classified algorithm from disclosure requires, at least at the current state of technology, a hardware implementation that embodies special measures to resist reverse engineering.

Classified encryption algorithms are often considered much stronger than those in the public domain since the algorithms used to protect government classified information are classified. But because they are not available for public review, suggestions that classified algorithms be used to protect unclassified information are suspect due to the possible existence of unknown deliberate trapdoors or unintentional flaws. While DES was initially viewed with suspicion by some, it was subject to intense public scrutiny and its principal strength now is that even after fifteen years, no serious flaw has been found.

Key escrow techniques as such do not require classified algorithms and can be used with publicly available algorithms such as DES and IDEA or with proprietary but unclassified algorithms such as RSADSI's RC2 and RC4. If a publicly available or proprietary unclassified algorithm were used in a product that embodied key escrow cryptography, it would not be necessary to have a hardware implementation for the purpose of protecting the encryption algorithm from disclosure (although there are other reasons for implementing key escrow cryptography in hardware, as the above list indicates).

This interdependence between hardware implementation and classified algorithm has caused considerable confusion in examining the feasibility of software key escrow approaches. If one requires a classified algorithm, one must use hardware to protect the algorithm whether one implements key escrow or not. If one chooses an unclassified public or proprietary algorithm, one is free to implement in hardware or software. The decision to implement in hardware and software is driven by other factors, such as those identified in the above list.

Benefits and Limitations of Software Encryption

Historically, encryption systems that have been used to protect sensitive information have been implemented as separate hardware devices, usually outboard "boxes" between a computer or communications system and a communications circuit. Such devices are designed with a high level of checking for operational integrity in the face of failures or malicious attack, and with especially careful measures for the protection of cryptographic functions and keys.

Software encryption systems have historically been viewed with suspicion because of their limited ability to protect their algorithms and keys. The paragraphs above discussed the issues associated with protecting classified (or secret) encryption algorithms from disclosure. Over and above these issues is the fact that an encryption algorithm implemented in software is subject to a variety of attacks. The computer's operating system or a user can modify the code that implements the encryption algorithm to render it ineffective, steal secret cryptographic keys from memory, or, worst of all, cause the product to leak its secret cryptographic keys each time it sends or receives an encrypted message.

The principal disadvantage of using encryption hardware, and therefore the primary advantage of integrated software implementations, is cost. When encryption is implemented in hardware, whether a chip, a board or peripheral (such as a PCMCIA card) or a box, end users have to pay the price. Vendors must purchase chips and design them into devices whose costs go up because of the additional "real estate" required for the chip. End users must purchase more expensive devices with integrated encryption hardware, or must buy PCMCIA cards or similar devices and then pay the price for adding a device interface to their computing systems or dedicating an existing interface to encryption rather than another function such as that performed by a modem or disk.

A second major advantage of software implementations is simplicity of operation. Software solutions can be readily integrated into a wide variety of applications. Generally, the mass market software industry, which attempts to sell products in quantities of hundreds of thousands or millions, seeks to implement everything it can in software so as to reduce dependencies on hardware variations and configurations and to provide users with a maximum of useful product for minimum cost.

SUMMARY OF THE INVENTION

The present invention is directed to a system and method for key escrow cryptography for use in a system comprising a sender and a receiver. By "sender" we mean a program or device that encrypts data for subsequent transport or storage. By "receiver" we mean a program or device that decrypts data that has been received or retrieved from storage. Only public keys are stored in the sender and the receiver so there is no need for secrecy of the software. According to one embodiment of the present invention, the sender encrypts a message using a secret session key (KS), and generates a leaf verification string (LVS) by combining an unique program identifier (UIP), a public portion of a program unique key (KUpub), and a signature. The signature represents the UIP and KUpub signed by a private portion of a key escrow programming facility (KEPF) key (KEPFpriv). An encrypted LVS (ELVS) is formed by encrypting LVS using KS.

The sender encrypts the KS using the KUpub to generate a first encrypted session key (EKS), and generates a first law enforcement access field (LEAF) by encrypting a combination of the first EKS and the UIP with a copy of a public portion of a family key (KFpub) stored in the sender. The encrypted message, the ELVS, and the first LEAF are transmitted from the sender to the receiver.

The receiver operates as follows. The receiver stores therein a public portion of the KEPF key (KEPFpub) and a public portion of the Family Key (KFpub). The receiver decrypts ELVS using KS and extracts the UIP, KUpub, and the signature from the LVS, and verifies the signature using KEPFpub. If the verification succeeds, the receiver then encrypts the KS using the extracted KUpub to generate a second encrypted session key (EKS). The receiver generates a second LEAF by encrypting a combination of the second EKS and the extracted UIP with a copy of the KFpub stored in the receiver. The receiver then compares the first LEAF to the second LEAF. If the first LEAF is equal to the second LEAF, then the receiver decrypts the encrypted message using the KS.

This embodiment of the present invention operates so that, with neither tamper resistance nor secrecy of the hardware or software of the sender or the receiver, no party having modified the hardware or software of either the sender or receiver can communicate successfully with an unmodified receiver or sender and, at the same time, prevent law enforcement from gaining authorized access to the communication.

According to another embodiment of the present invention, an encrypting user encrypts a file using a secret storage key (KS) and generates a data recovery field (DRF) comprising an access rule index (ARI) and KS encrypted by a data recovery center (DRC) public key (DRCpub). DRCpub is acquired in an initial registration phase wherein the AR defining user defines a set of access rules (ARs) that control potential later accesses to the DRF contents. After the DRC receives the AR from the AR defining user, the DRC returns the ARI to be included in one or more DRFs attached to subsequent encrypted files.

To decrypt the file encrypted with KS, a normal decrypting user uses whatever mechanism is customary for specifying or accessing a storage key, KS. Failing that, emergency access is achieved via the DRF. In this case, the emergency decrypting user extracts the DRF attached to the encrypted message and sends the DRF to the DRC. The DRC challenges the emergency decrypting user according to the ARs defined by the AR defining user and sends a message containing KS to the emergency decrypting user if the emergency decrypting user meets the challenge.

In alternative embodiments, KS is not an encryption key but rather any piece of confidential information that can fit inside the DRF. In all cases, the DRC limits access to emergency decrypting users who can meet the challenge defined by the AR indicated by the ARI in the DRF.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIGS. 2–9 and 17 are flowcharts depicting the key escrow cryptographic system according to the first embodiment of the present invention;

FIGS. 21–23 and 25 are flow charts depicting access rule definitions;

DETAILED DESCRIPTION OF THE PREFERRED EMBODIMENTS

Figure 1:
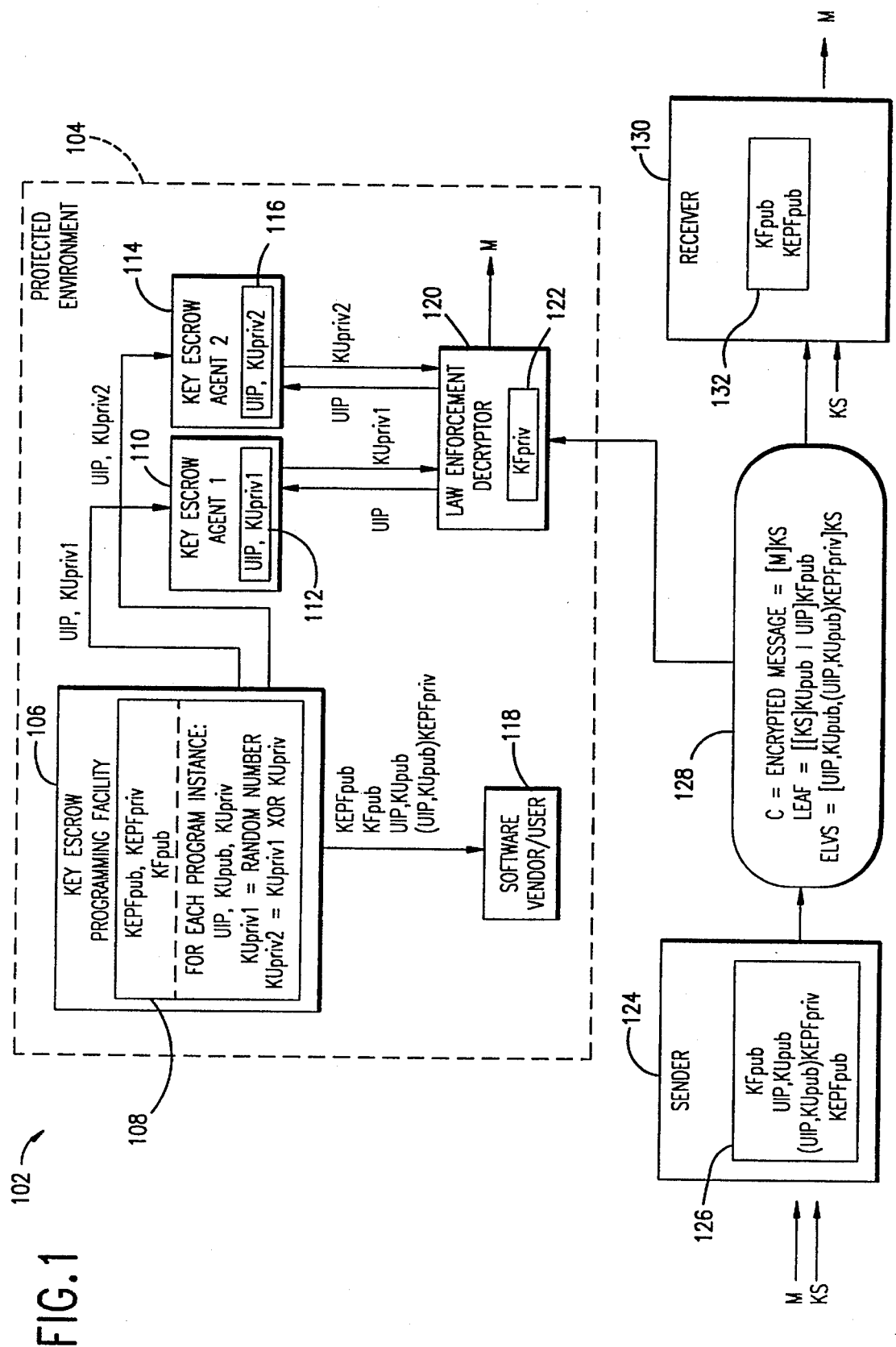
FIG. 1 is a block diagram of a key escrow cryptographic system according to a first embodiment of the present invention.

The present invention is directed to a system and method for key escrow cryptography. Preferably, the present invention is implemented in software. However, the present invention works equally well when implemented using hardware.

The present invention preferably employs an unclassified data encryption algorithm. Thus, the objection that software cannot protect a classified encryption algorithm does not apply to the present invention.

Another objection against software is that it cannot ensure that the key escrow software will function correctly and not be modified by a user to bypass or corrupt the escrow process. It is noted that this objection is not limited to just software, but also applies to hardware implementations which allow software to control the flow of information to and from the hardware encryption device.

Another objection against software is that it is impossible to embed secret cryptographic keys in a software product without a significant risk that they would be disclosed. The present invention addresses and solves this problem inherent in conventional software implementations of key escrow by not embedding secret keys or private keys in the sender and receiver software modules. This feature of the present invention is discussed below.

Preferably, in the present invention, encryption and decryption operations are performed using any well known, unclassified, and publicly available algorithms such as DES and IDEA or with any well known, proprietary but unclassified algorithms such as RSADSI's RC2 and RC4. The specific details of the encryption and decryption algorithm are not material to the present invention.

The following symbols are used herein.

[a]b indicates that "a" is encrypted using key "b"; similarly, encrypt(e,f) indicates that "e" is encrypted using key "f".

{x}y indicates that "x" is digitally signed using well known procedures using key "y"; similarly, sign(a,b) indicates that "a" is digitally signed using key "b".

a|b indicates that "a" is concatenated with "b".

decrypt(m,n) indicates that "m" is decrypted using key "n".

extract(g,h) indicates that "h" is extracted using well known procedures from concatenated value "g".

verify(a,b,c,) indicates that the signature "b" or "a" is verified using key "c".

xor(o,p) indicates that "o" is bitwise exclusive-OR'ed with "p".

As used herein, values having labels with a suffix "priv" are considered to be private or secret. Values having labels with a suffix "pub" are considered to be public.

Concerning the symbol represented by $Z=[X]Y$ (X encrypted by Y), if Y is a public key, and Z needs to be re-built by some other program not having the private key corresponding to Y, then this encryption needs to be direct with all unused bits around X either known or communicated to the re-building process. If there is no need to re-build Z, this can be either direct or indirect encryption. That is, one can equivalently compute $Z=([X]K_1,[K_1]Y)$ (where $K_i$ is a conventional, randomly chosen, symmetric encryption key) and achieve the same functional result. This may be desirable if X is larger than the quantity one can encrypt directly under Y in one pass. Similarly, one might also compute $Z=([X]K_2,[K_2]K_1,[K_1]Y)$.

Overview of the Present Invention

Described below are three embodiments, two applying to a system and method of key escrow cryptography and a third applying to data escrow cryptography. The first two embodiments generally share the following preferred features:

- Both embodiments ensure that no party having modified the software of sender or receiver can communicate successfully with an unmodified receiver or sender and, at the same time, deny law enforcement authorized access to the communication.

- For both embodiments, the receiving party to a communication reconstructs the sender's LEAF to verify that the received LEAF is both valid and the correct LEAF for the current encrypted communication. This choice counters single rogue attacks.

- Both use an escrow protocol based on public key cryptography to build the law enforcement access field (LEAF) that makes the user's keys available to law enforcement authorities. This choice obviates the need to include in the software products any secret keys that would be part of the escrow process.

Both preferably use unclassified public or proprietary encryption algorithms to perform all cryptography functions.

The third embodiment, on the other hand, focuses on the recovery of stored information rather than the recovery of transmitted information. In this embodiment, the data recovery field (DRF), an analogous structure to the LEAF, allows a user to function in a similar role to the law enforcement authorities of the previous embodiments. Access can be obtained not only through a court imposed order but also through any set of access rules (ARs) defined by the sender.

1. First Embodiment

FIG. 1 is a block diagram of a key escrow system 102 according to a first embodiment of the present invention. The key escrow system 102 includes a key escrow programming facility (KEPF) 106, two or more key escrow agents (KEAs) 110, 114, sending and receiving entities 124, 130, and a law enforcement decryptor 120.

Figure 18:
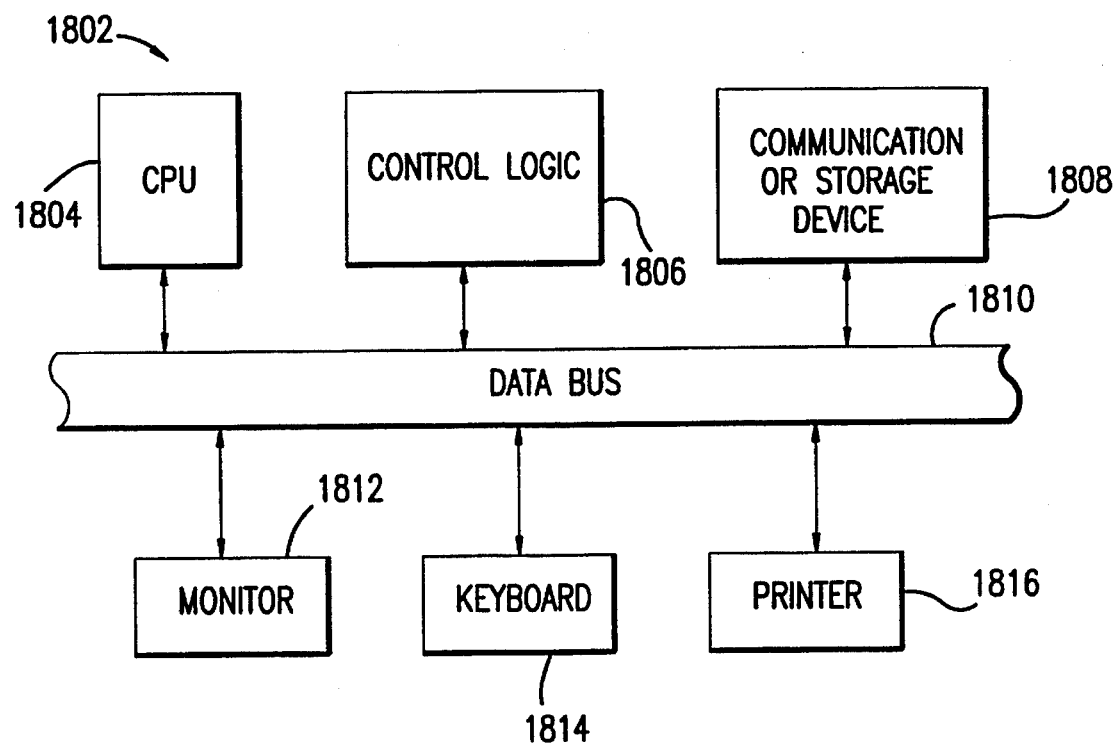
FIG. 18 is a block diagram of a data processor according to an embodiment of the present invention.

A block diagram of the sending entity 124 is shown in FIG. 18. Preferably, the sending entity 124 is a data processing device 1802 having a central processing unit (CPU) 1804 connected to other devices via a data bus 1810. The CPU 1804 operates in accordance with control logic 1806. Control logic 1806 is preferably a computer program, such that the CPU 1804 operates in accordance with instructions contained in the computer program.

The data processing device 1802 also includes a communications or storage device 1808, a monitor 1812, a keyboard 1814, and a printer 1816. Communications between the sending entity 124 and other devices, such as the receiving entity 130, are achieved by operation of the communication or storage device 1808, which is any well known transmitter or storage medium.

In accordance with the present invention, the control logic 1806 enables the sending entity 124 (and, in particular, the CPU 1804) to operate as discussed herein. For example, the control logic 1806 (when executed by the CPU 1804) enables the sending entity 124 to perform the steps shown in FIG. 7.

The structure of the receiving entity 130 is similar to the sending entity 124 and, thus, the above description applies equally well to the receiving entity 130. However, in accordance with the present invention, the control logic 1806 in the receiving entity 130 enables the receiving entity 130 (and, in particular, the CPU 1804) to operate as discussed herein. For example, the control logic 1806 (when executed by the CPU 1804) enables the receiving entity 130 to perform the steps shown in FIG. 8.

Since the control logic 1806 in both the sending and receiving entities 124, 130 preferably represent software, the sending and receiving entities 124, 130 are sometimes called herein "programs". However, it should be understood that such "programs" represent a device 1802 operating in accordance with software. Also, according to an alternate embodiment of the invention, the sending and receiving entities 124, 130 are implemented entirely in hardware (for example, the CPU 1804 and the control logic 1806 represent hardware state machine(s)).

As mentioned above, one difference between this system 104 and the Clipper/Capstone system is that this system 104 uses public key cryptography in place of conventional (symmetric) cryptography to generate the law enforcement access field or LEAF. As is well known, with symmetric cryptography, sender and receiver share a key that is used to control both encryption and decryption. With asymmetric cryptography, encryption and decryption use separate keys which cannot be computed from one another. Thus, an encryption key can be made public (a "public key") and anyone can send a secret message which can only be decrypted by the holder of the corresponding ("private") decryption key. The use of public key cryptography allows the software programs 124, 130 to generate and validate LEAFs without having to store secret keys or private keys. Only public quantities need be embedded in the software programs 124, 130 and, therefore the present invention does not need to preserve the secrecy of its own structure or content. The elements of the system 102 shall now be described.

1.1 The Key Escrow Programming Facility

The key escrow programming facility (KEPF) 106 is within a protected environment 104. A protected environment 104 is defined as a physically and procedurally secured area whose protection is adequate to the value of all information that will be protected by any key escrow encryption program.

Figure 2:
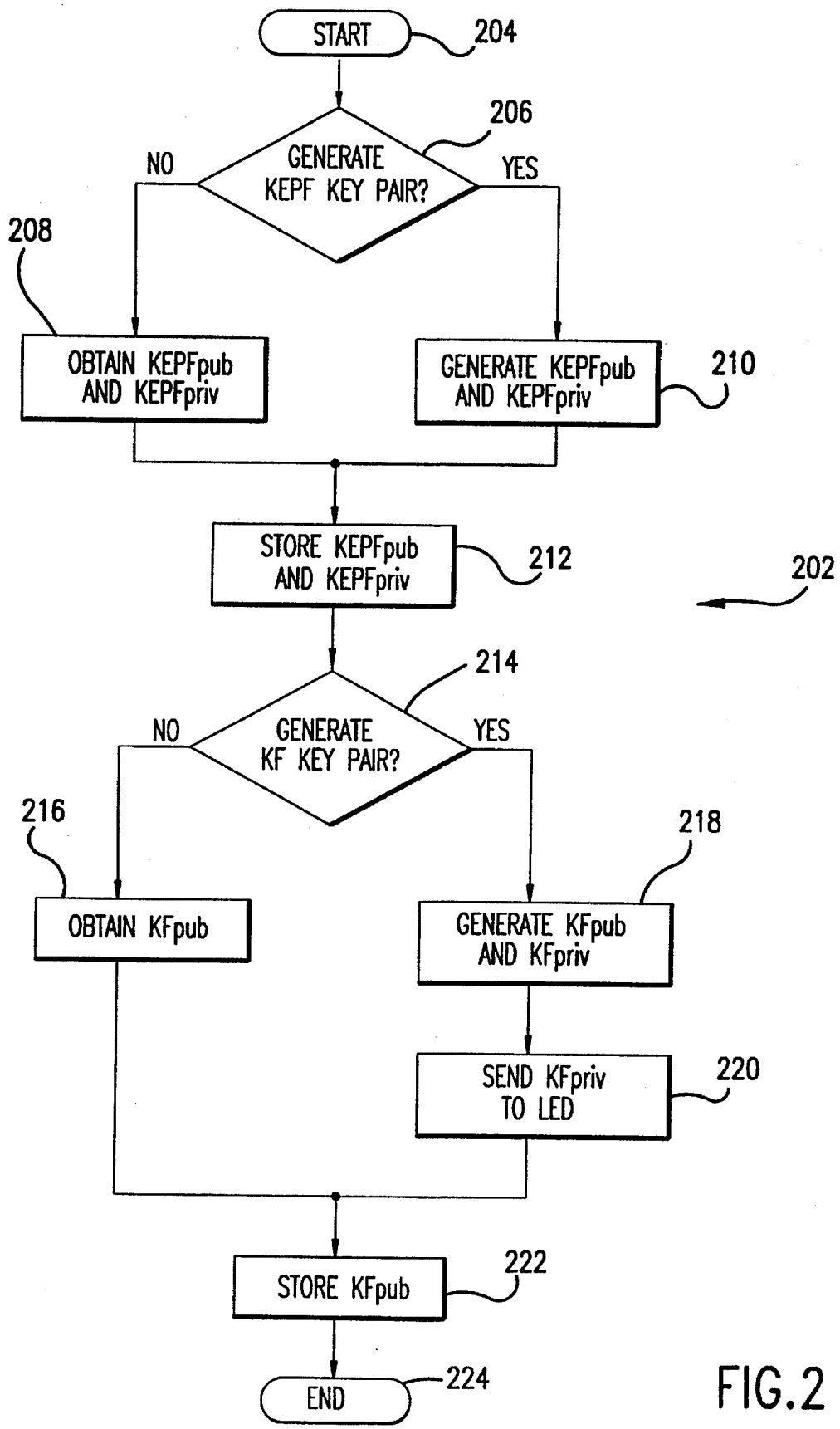

The KEPF 106 includes various cryptographic-related data 108. Such data 108 stored in the KEPF 106 cannot be accessed by persons or entities outside the protected environment 104. The manner in which the KEPF 106 initializes such data 108 shall now be described with reference to a flowchart 202 in FIG. 2.

The KEPF 106 is initialized with two public/private key pairs. The first is a KEPF public/private key pair, initialized in steps 206, 208, 210, and 212, which is used to sign and authenticate other components that are generated and distributed by the KEPF 106. The KEPF key pair is generated externally and loaded into the KEPF 106 (step 208), or generated internal to the KEPF 106 (step 210). Controls can be applied to the generation and custody of the KEPF key pair as they are to the family and seed keys that are used by the Clipper/Capstone chip programming facility. The KEPF public/private key pair is stored in a memory device in step 212.

The second key pair used by the KEPF is a family key (KF) and is initialized during steps 214, 216, 218, 220, and 222. KF is preferably generated external to the KEPF 106 (step 216), although it may be generated internally (step 218). Only the public component (KFpub) is sent to the KEPF 106 (step 222). The corresponding private component (KFpriv) is loaded into the Law Enforcement Decryptor (LED) 120 (step 220). The private component of KF can also be split into halves and escrowed.

1.2 Law Enforcement Decryptor

The Law Enforcement Decryptor (LED) 120 is also within the protected environment 104. the LED includes the Family Private Key KFpriv 122.

The LED 120 initializes the Family Private Key 122 as shown in FIG. 4. In step 406, the LED obtains the private component of KF, KFpriv, which is stored in a memory device in step 408.

1.3 Generating Program Parameters

Figure 3:
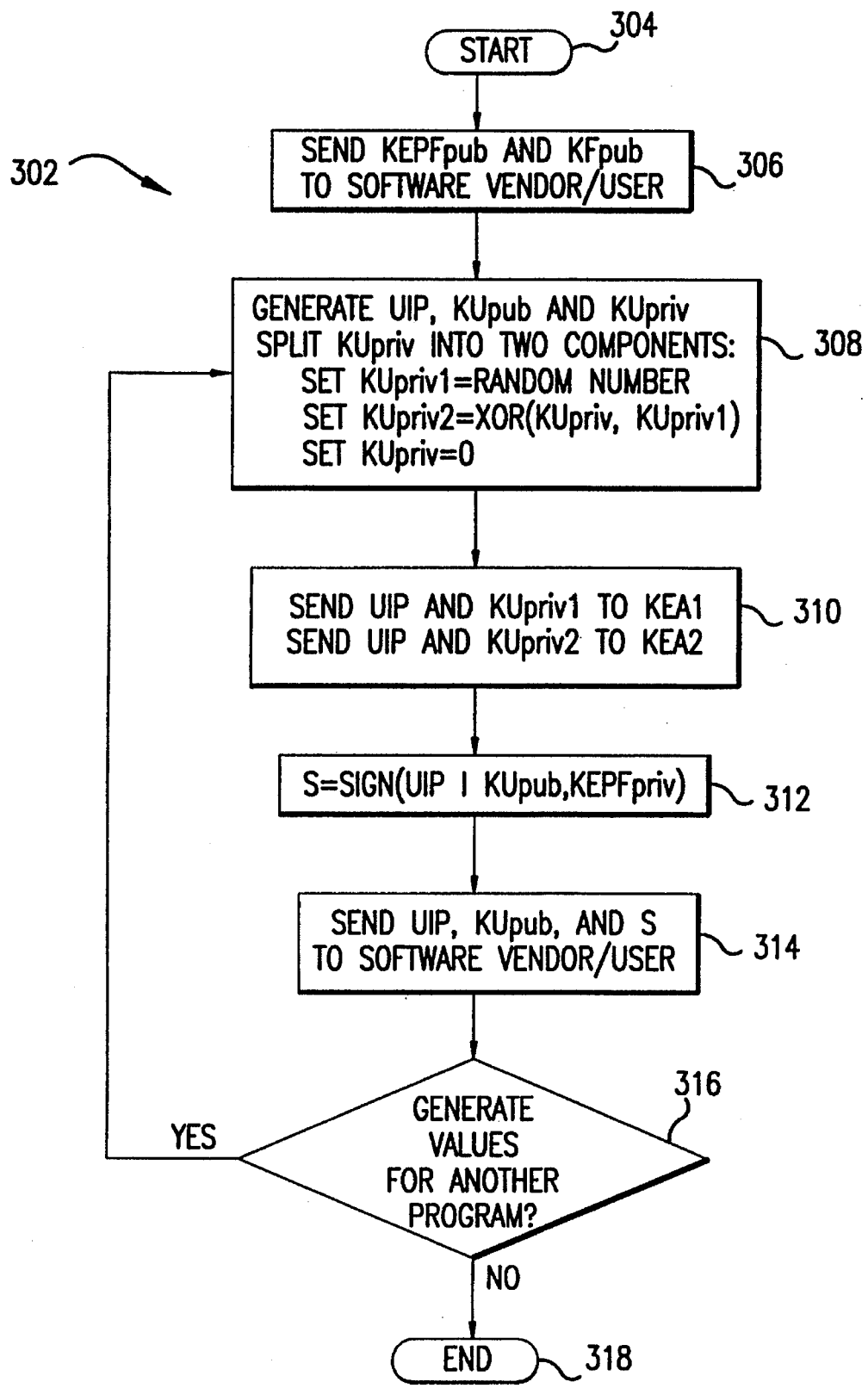

On an ongoing basis, the KEPF 106 signs and optionally generates unique program parameters for each program instance, just as the Clipper/Capstone programming facility programs each individual chip. In particular, as shown in a flowchart 302 of FIG. 3, the KEPF 106 in step 306 sends the KEPFpub and KFpub to a software vendor/user 118. Steps 308–324 are then performed for each program instance.

In step 308, the KEPF 106 generates or acquires a program unique identifier (UIP) and a program unique key (KU). Preferably, KU is an asymmetric public/private key pair. KU is generated within the KEPF 106 and may be seeded with externally generated parameters that are loaded into the KEPF 106. The private component of KU (KUpriv) is split into halves (308). This is preferably done by generating a random bit string as long as KUpriv which becomes KUpriv1 and calculating KUpriv2 as the exclusive-OR of KUpriv1 and KUpriv. Other procedures could alternatively be used to split KUpriv.

In step 310, the UIP and individual private key halves are escrowed with the two escrow agents (KEAs) 110, 114. Specifically, as shown in a flowchart 501 in FIG. 5, the escrow agent 110 receives the UIP and KUpriv1 (step 504) and stores UIP and KUpriv1 (step 506). These steps are repeated for each program instance, as indicated by step 508. The operation of the other escrow agent 114 is identical to this.

In steps 312 and 314, the KEPF 106 sends the program unique parameters, UIP and KUpub, to the software vendor 118 to be embedded into the software program product. In step 312, the KEPF 106 uses well known procedures to digitally sign these parameters using its private key, KEPFpriv, and sends the signature along with the components to the software vendor 118 (step 314). The programming facility public key (KEPFpub) and the family key public component (KFpub) are also sent to the vendor 118. Steps 308–314 are repeated for each program instance, as indicated by step 316.

1.4 Generating the Software Product

If the KEPF 106 communicates its public key KEPFpub to the vendor 118 by an out of band (secure) channel, the vendor 118 can reliably authenticate sets of parameters (KFpub, UIP, KUpub) received from the KEPF 106. This is the case since, as is well known, data encrypted (or digitally signed) with a private key can be decrypted (or verified) by anyone possessing the corresponding public key. Also, data encrypted with a public key can be decrypted only using the corresponding private key.

As represented in a flowchart 602 of FIG. 6, as the software vendor 118 manufactures software copies of its product, it embeds KFpub and KEPFpub in the product code (step 608). It had received KFpub and KEPFpub from the KEPF 106 (step 606). Each instance of the program must be initialized with:

KEPFpub

KFpub

KUpub unique to that instance of the program

UIP unique to that instance of the program

S={KFpub, KUpub, UIP}KEPFpriv unique to that instance of the program.

This data can reside in the code of the program or in a storage file associated with the program. KEPFpub, KFpub, and S must come from the KEPF. KUpub, KUpriv, and UIP can be generated by the KEPF, the vendor or the program itself during initialization. S must be generated by the KEPF only on receipt or generation of a valid KUpub, KUpriv, pair and the successful escrowing of KUpriv.

Preferably, the vendor 118 embeds the program unique parameters (UIP, KUpub and the associated signatures) for each program into the media for the program (step 612). UIP, KUpub and the associated signatures were received from the KEPF 106 in step 610. Steps 610 and 612 are performed for each software product, as indicated by step 614.

The data described above is represented by reference number 126 in the sending program 124 and reference number 132 in the receiving program (FIG. 1).

Note that no secret keys or private keys are present within the software product. Only public quantities, KEPFpub, KFpub, and KUpub are embedded in the software product.

In cases where a software product is distributed on CDROM media that is manufactured in bulk (and can not accept unique serial number or key information), or where it is installed on a shared storage device for access by multiple users, it is not feasible to embed a unique KUpub, UIP and the associated signatures for each copy of the product. In these cases, the user of the product can be required to run an installation program that retrieves KUpub, and UIP and their signature over a network or communication line. The operation of the product's encryption function can be made contingent on the execution of the installation program and possession of KUpub, UIP, and the corresponding valid signature.

Since the only quantities that are needed to customize the escrow software for its user are signed digitally and public, there is no risk to retrieving them over a network or other insecure communication channel. Their confidentiality is not at issue, and their integrity can be authenticated using KEPFpub which is common to all users and copies of the product and can be embedded by the vendor 118.

An alternative to having the product retrieve KUpub and UIP is to have the product generate UIP and KU during the initialization process and send all components (UIP, KUpub and KUpriv) to the KEPF 106 encrypted under KEPFpub. In this variation, the KEPF 106 would split KUpriv and distribute the halves to the escrow agents 110, 114, sign [UIP/KUpub], KUpub and send {UIP|KUpub}KEPFpriv back to the product.

1.5 Operation of the Sending Program

As represented by a flowchart 702 in FIG. 7, the sending program 124 receives a data message M in step 706. In step 708, the sending program 124 and the receiving program 130 use any well known procedure for negotiating a secret session key 708. In steps 710 and 712, the sending program 124 encrypts and then transmits the data message M using the secret (or private) session key KS. This encrypted message C is denoted by [M]KS.

Also in step 710, the sending program 124 generates a LEAF by encrypting the session key KS under the program unique public key KUpub to thereby generate [KS]KUpub. [KS]KUpub is also called the encrypted session key, or EKS. The EKS is concatenated with the program unique identifier UIP to thereby generate [KS]KUpub|UIP. This value is encrypted with the family public key KFpub. The resulting LEAF is symbolized as [[KS]KUpub|UIP]KFpub. Note that in the present invention encryption of M is accomplished using symmetric encryption while encryption in the LEAF under keys KUpub and KFpub is accomplished using asymmetric, rather than symmetric cryptography.

Also in step 710, the sending program 124 generates a LEAF verification string (LVS) that includes: (1) the sending program 124's program unique identifier UIP, (2) program unique public key KUpub, and (3) the signature S applied to those two quantities by the key escrow programming facility 106, i.e., {UIP,KUpub}KEPFpriv (these three items are called the leaf verification string, LVS). This string is encrypted under the session key, KS. Thus, the ELVS, is represented as follows:

[UIP, KUpub, {UIP,KUpub}KEPFpriv]KS

In step 712, C, LEAF, and ELVS are sent to the receiving program 130.

1.6 Operation of the Receiving Program

Figure 8:
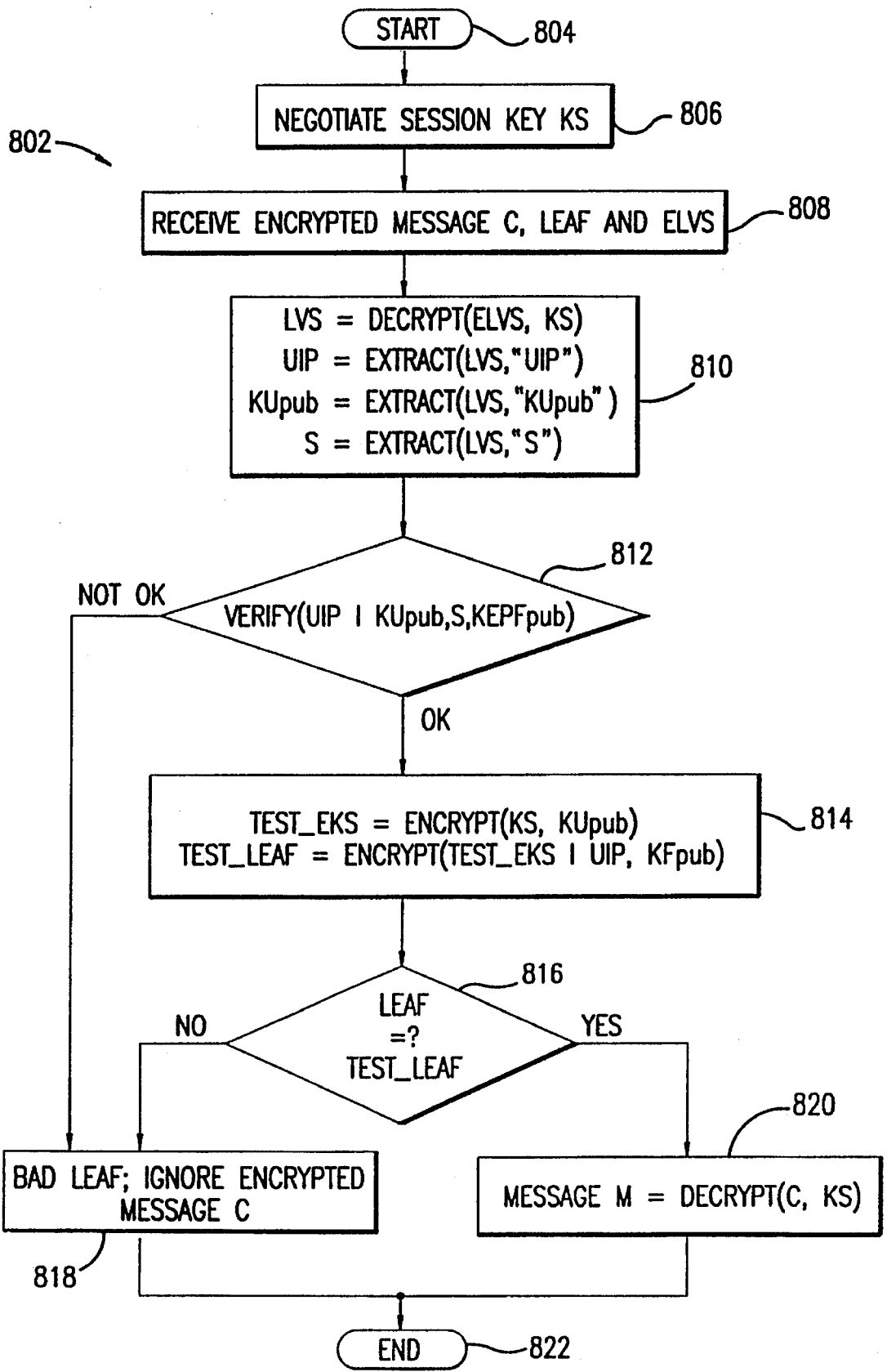
Figure 9:
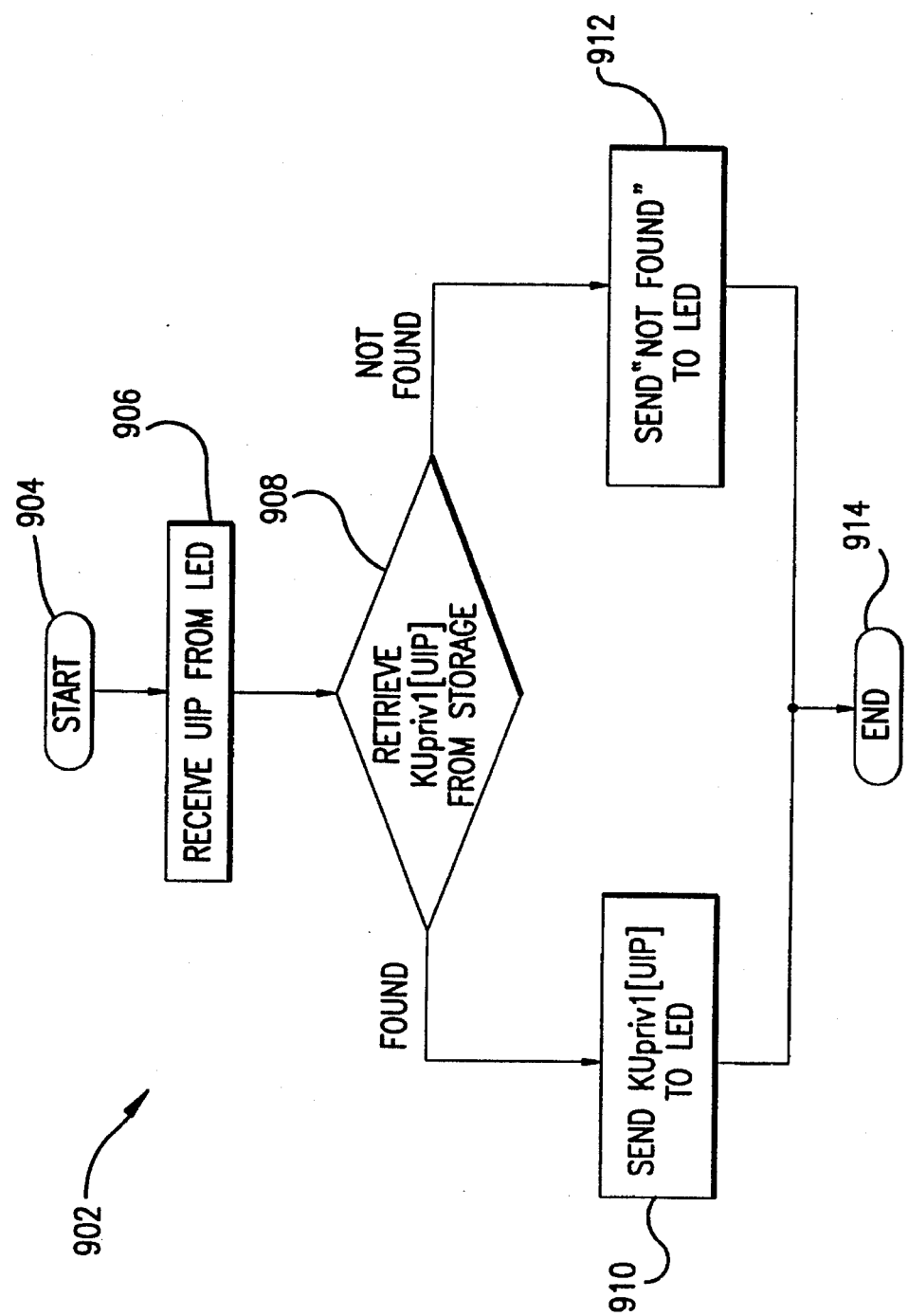

As represented in a flowchart 802 of FIG. 8, the receiving program 130 in step 806 negotiates a secret session key KS with the sending program 124 (this corresponds to step 708 in FIG. 7). In step 808, the receiving program 130 receives C, LEAF, and ELVS from the sending program 124.

In step 820, the receiving program 820 decrypts the encrypted message C using the session key KS to recover the message M. However, prior to doing so, the receiving program 820 must authenticate the LEAF to ensure that the sending program 124 has included a valid LEAF as part of the message transmission. This is done during steps 810, 812, 814, and 816.

Note that the receiving program 130 cannot decrypt the LEAF, since it does not have a copy of the family private key KFpriv. Instead, according to the present invention, the receiving program 130 authenticates the LEAF by reconstructing it. This is possible since the receiving program 130 has been provided with all of the components that make up the LEAF either through communication external to the operation of the escrow system (KF and KS) or because they were sent signed in the encrypted LEAF verification string ELVS.

Specifically, in step 810 the receiving program 130 decrypts the encrypted leaf verification string ELVS using the session key KS to obtain the leaf verification string LVS, or {UIP, KUpub, UIP|KUpub}KEPFpriv. Then in step 810 the receiving program 130 verifies that the received copies of the sending program 124's program unique key KUpub and program unique identifier UIP (which are in the LVS) are correct and authentic. This is done in step 812 by verifying the corresponding signature S or {UIP|KUpub}KEPF priv using KEPFpub If the leaf verification string LVS is authentic (as determined in step 812), then the receiving program 130 in step 814 recalculates the LEAF (this is called the "test_LEAF" in FIG. 8) using KS, KFpub, and the sending program 124's KUpub and UIP. If the calculated LEAF is identical to the one received (as determined in step 816), then the LEAF is valid. Accordingly, the receiving program 130 accepts and decrypts the message (step 820). Otherwise, the receiving program 130 rejects the message (step 818).

The use of the session key KS to encrypt the leaf verification string LVS is not necessary to the function of verifying the LEAF. Instead, this step protects the sending program 124's UIP and KUpub from disclosure to parties who are not in communication with it.

1.7 Law Enforcement Decryptor

The law enforcement decryptor (LED) 120, which is operated by the law enforcement agency, contains the family private key KFpriv (indicated as 122 in FIG. 1). This is represented in a flowchart 402 of FIG. 4, where the LED 120 receives the KFpriv from the KEPF 106 in step 406 (corresponding to step 220 in FIG. 2 in the case where KFpriv is generated in the KEPF 106; where KFpriv is generated outside the KEPF 106 by an external entity, not shown, then the external entity sends the KFpriv to the LED 120). In step 408, the LED 120 stores the KFpriv in a memory device of the LED 120.

Figure 17:
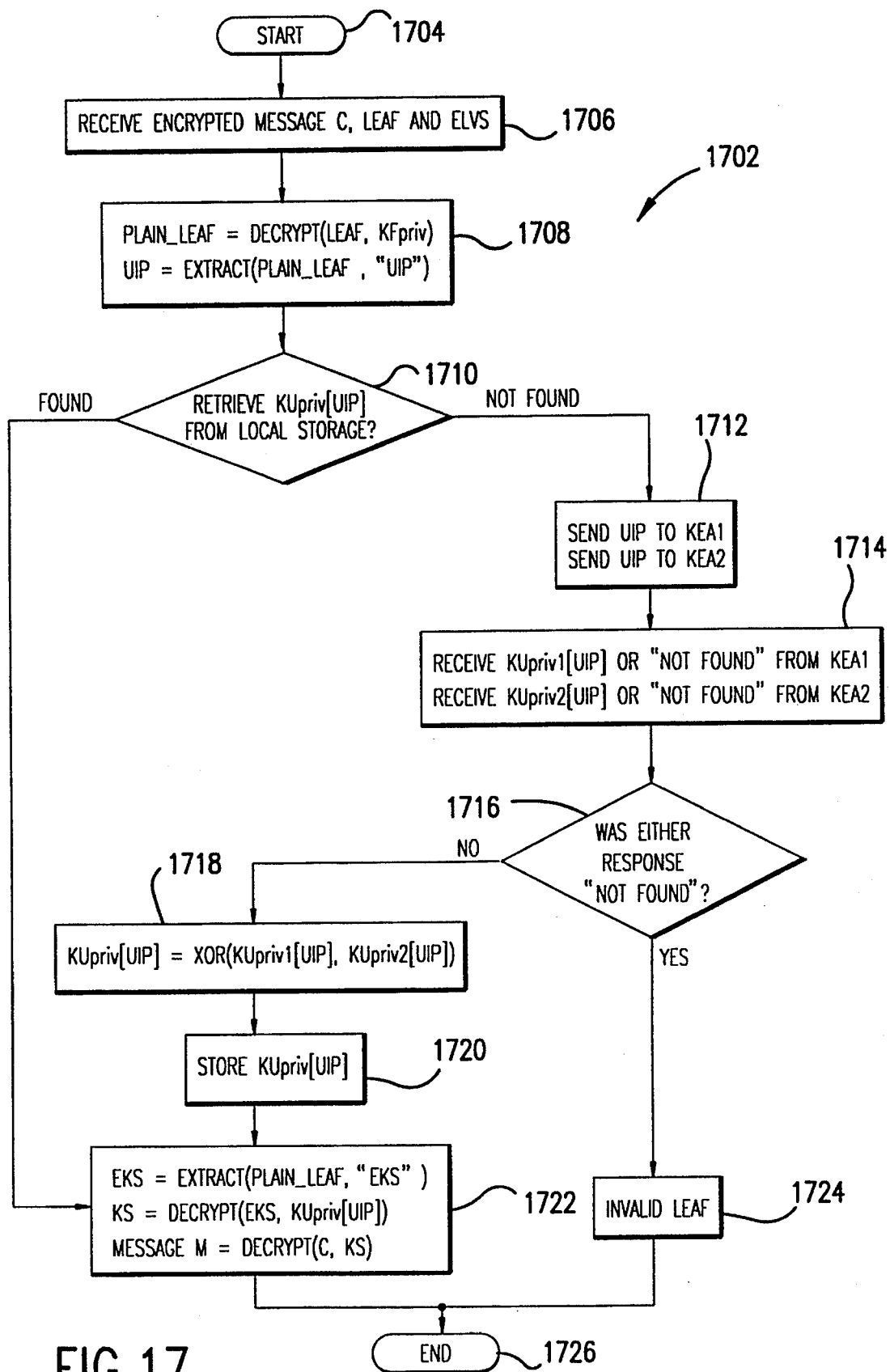

Since the LED 120 has possession of KFpriv, the LED 130 can decrypt the LEAF. This operation is represented in a flowchart 1702 in FIG. 17. In step 1706, the LED 120 receives C, LEAF, and ELVS from the sending program 124. In step 1708, the LED 130 decrypts the LEAF using KFpriv, and extracts the UIP from the decrypted LEAF (called "plain_LEAF" in FIG. 17). In steps 1710, 1712, 1714 and 1716, the LED 120 uses UIP to obtain the sending program 124's unique private key components, KUpriv1 and KUpriv2, from the respective key escrow agents 110, 114. If either key escrow agent indicates that they cannot find the private key component corresponding to UIP, then the LEAF is invalid (step 1724). In step 1718, the LED 130 combines KUpriv1 and KUpriv2 using preferably a well known exclusive-OR operation to form the sending program 124's program unique key, KUpriv. KUpriv is stored in the LED 120 in step 1720. With KUpriv, the LED 130 in step 1722 decrypts the session key KS. Also in step 1722, given KS, the LED 120 decrypts the message.

2. Second Embodiment: On-line Escrow Agents

The key escrow protocol of the Clipper initiative has been criticized since it was initially disclosed because of the fact that a device whose unique key (KU in the original Clipper scheme) has been withdrawn from the escrow agents is subject to decryption from the time of withdrawal onward. While the stated policy of the Clipper initiative is that unique keys will be erased from the law enforcement decryplot (LED) once the wiretap authorization has expired, that policy is cold comfort to individuals who find key escrow unappealing to begin with.

The first embodiment of the software key escrow system of the present invention, described above, shares with the Clipper initiative the use of a device unique key (KUpriv) that is loaded into the law enforcement decryptor LED 120 and that must be erased when a wiretap authorization has expired. In addition, it is possible that a malicious user with a modified software product can harvest and reuse the escrow information (UIP and KUpub) for any other user with whom he or she communicates securely potential deficiency, in that it can cause the law enforcement agency to retrieve KUpriv for innocent partner.

The second embodiment of the software key escrow system of the present invention addresses and solves these concerns. The second embodiment does away with the unique key (KU, KUpub, KUpriv) and identifier (UIP). Instead, each sender splits its session key KS and encrypts one fragment under the public key of each escrow agent. This scheme still incorporates a LEAF and a LEAF verification string, but it does away with the KEPF and simplifies the role of the vendor.

Figure 10:
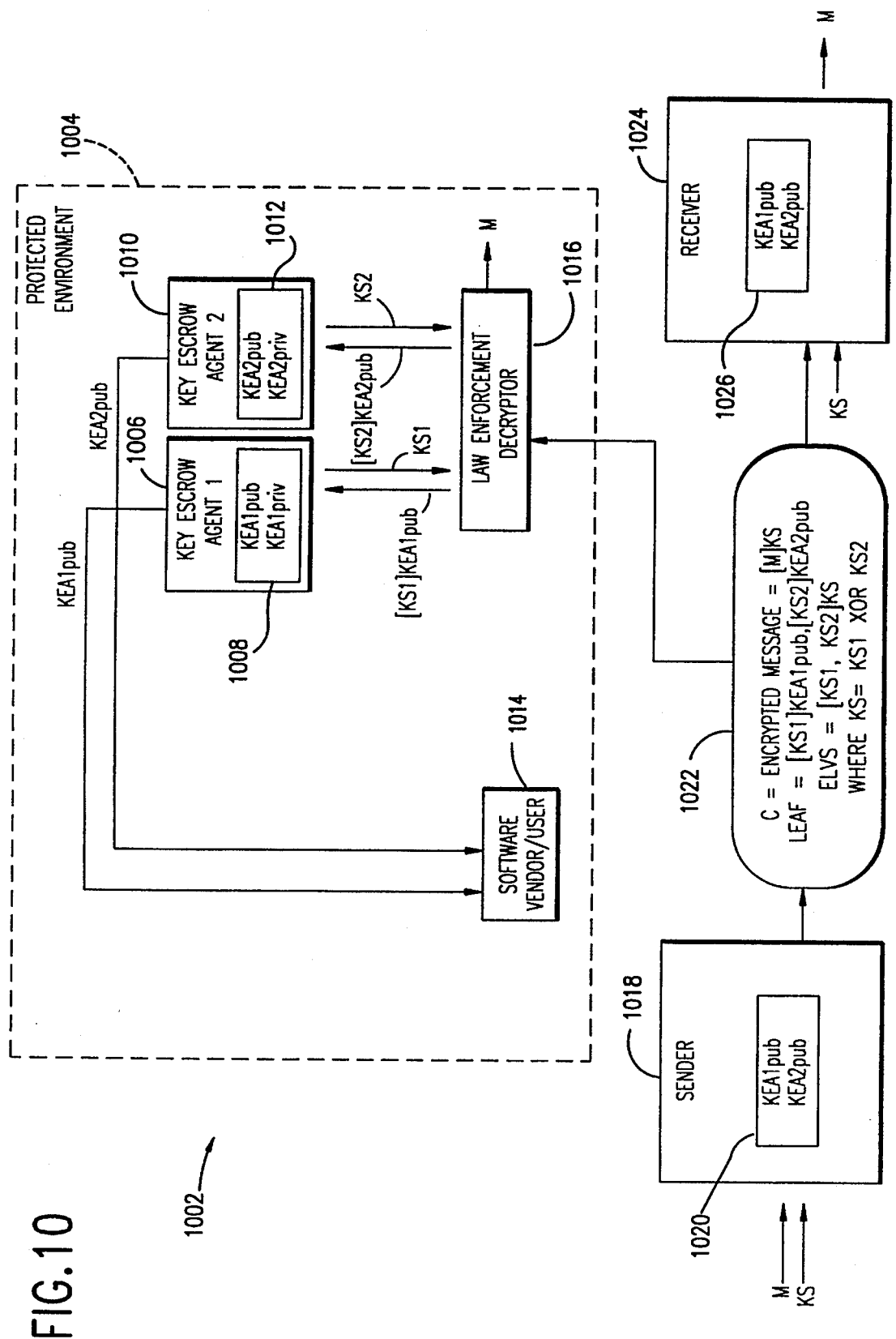
FIG. 10 is a block diagram of a key escrow cryptographic system according to a second embodiment of the present invention.

FIG. 10 is a block diagram of the second embodiment. KEApub1 and KEApriv1 (designated as 1008) are stored in the key escrow agent 1006, and KEApub2 and KEApriv2 (designated as 1012) are stored in the key escrow agent 1010. Note that there is no key escrow programming facility (KEPF). However, there is some entity (not shown; this entity could be called the KEPF) in the protected environment 1004 that initializes the key escrow agents 1006 and

Figure 11:
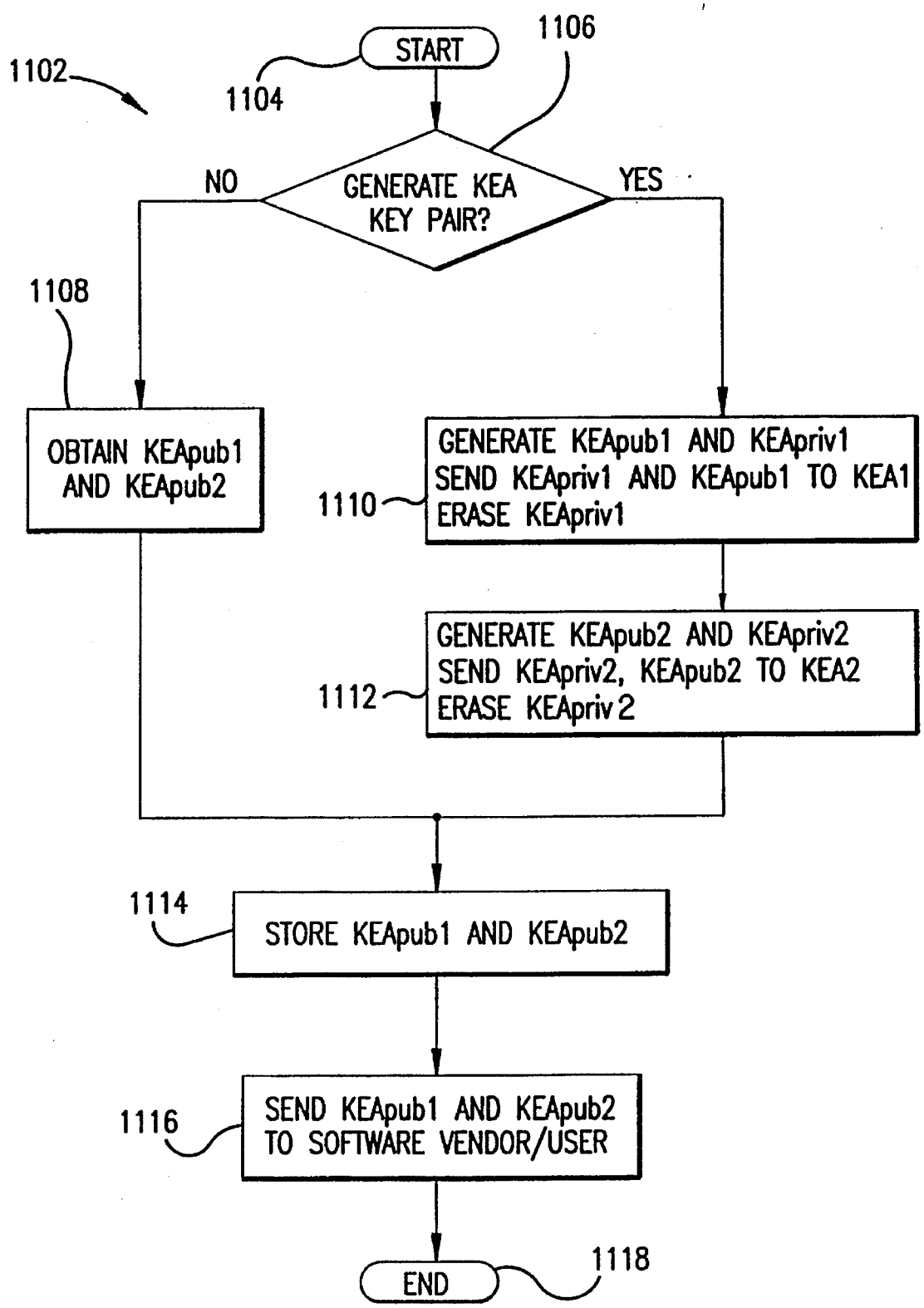
FIGS. 11–16 are flowcharts depicting the key escrow cryptographic system according to the second embodiment of the present invention.

1010. Such initialization is represented by a flowchart 1102 in FIG. 11, where in step 1108 the entity obtains KEApub1 and KEApub2 from an external source (not shown). Alternatively, in steps 1110 the entity generates KEApub1, KEApriv1, KEApub2, and KEApriv2, sends KEApriv1 and KEApub1 to key escrow agent 1006, sends KEApriv2 and KEApub2 to key escrow agent 1010, and erases KEApriv1 and KEApriv2. In step 1114, the entity stores KEApub1 and KEApub2. In step 1116, the entity sends KEApub1 and KEApub2 to the software vendor 1014. Alternatively, as shown in FIG. 10, KEApub1 and KEApub2 are sent to the software vendor 1014 from key escrow agents 1006 and 1010.

Figure 12:
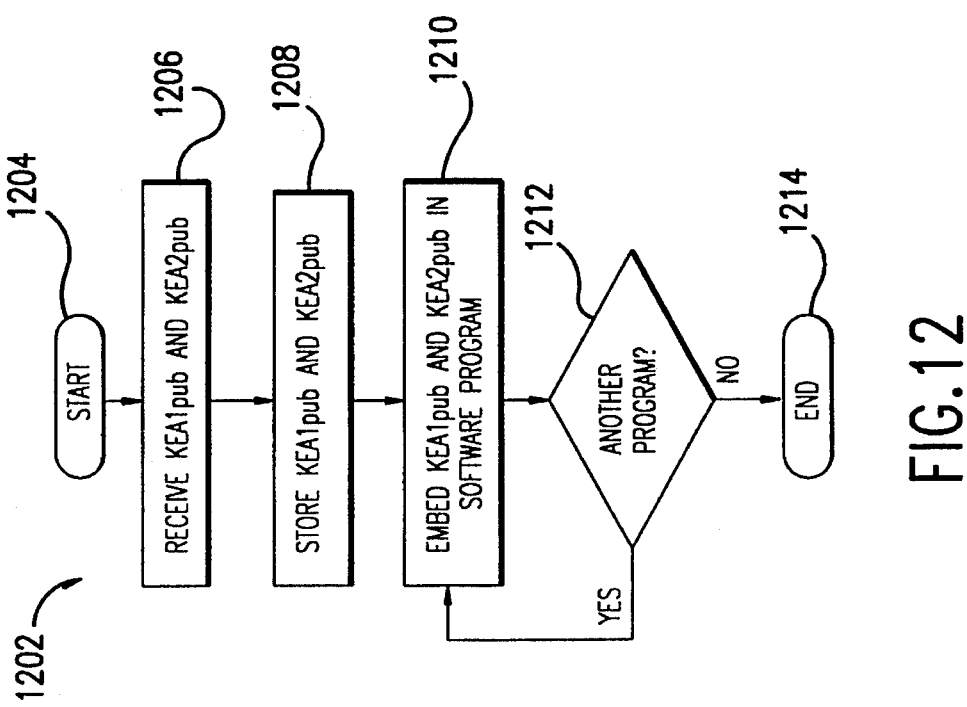

The vendor 1014's sole role is to embed in each program instance the code that implements the key escrow functions and the public keys of two (or more) escrow agents (KEApub1 and KEApub2). These keys are represented by 1020 and 1026 in the sending program 1018 and the receiving program 1024, respectively. The operation of the software vendor 1014 is represented in FIG. 12, where in step 1206 the software vendor 1014 receives KEApub1 and KEApub2 from the key escrow agents 1006, 1010, in step 1208 the software vendor 1014 stores KEApub1 and KEApub2, and in steps 1210 and 1212 the software vendor 1014 embeds KEApub1 and KEApub2 in each software program.

Figure 13:
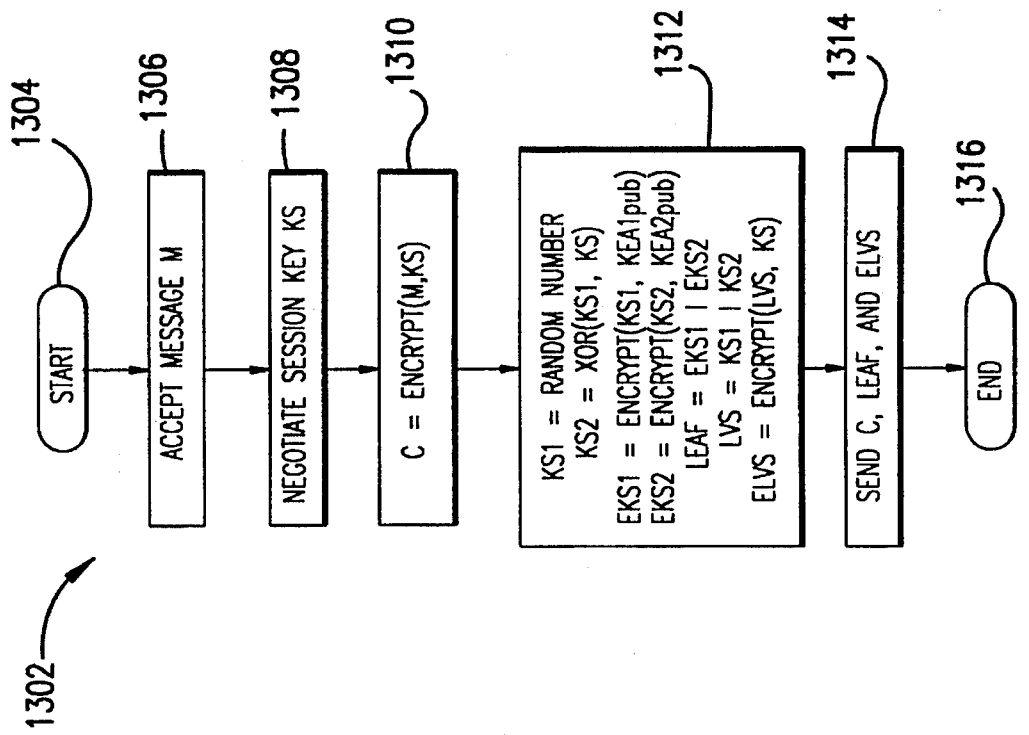

The sending program 1018 operates as shown in a flowchart 1302 of FIG. 13. In step 1306, the sending program 1018 receives a message M. In step 1308, the sending program 1018 negotiates a secret session key KS with the receiving program 1024 using any well known procedure. In step 1310, the sending program 1018 encrypts the message M using the session key KS.

In step 1312, the sending program 1018 splits the session key KS into two halves KS1 and KS2. Preferably, this is known by assigning a random number to KS1, and then assigning KS2 to the exclusive-OR of this random number and KS. The sending program 1018 also generates a LEAF during step 1312. The LEAF is equal to the concatenation of (1) KS1 encrypted under KEApub1 and (2) KS2 encrypted under KEApub2, and can be represented by:

LEAF=([KS$_1$]KEApub$_1$, [KS$_2$]KEApub2)

The LEAF need not be encrypted with KFpub, since KEApriv$_i$ are not available to anyone and presumably the only path to these decrypting services is via the LED. The KEApub$_i$ encryptions are enough to preserve the privacy of the LEAF contents without resorting to KFpub encryption. However, if there is some communications path to the "escrow" (decrypting) agents other than through the LED or if there are to be different classes of user, some of which the LED may not be allowed to access, the family key, KFpub, provides needed security. It should be noted that this embodiment is not limited to a 2-way split session key. In alternative embodiments, any number of splits, from 1 on up may be utilized. The general LEAF is represented by:

LEAF=([KS$_1$]KEApub$_1$, [KS$_2$]KEApub$_2$, . . . , [KS$_n$]IKEApub$_n$)

or

LEAF=[[KS$_1$]KEApub$_1$, [KS$_2$]KEApub$_2$, . . . , [KS_n]KEApub$_n$]KFpub for n>0

The choice of LEAF construction depends on whether or not extra protection from KFpub encryption is desired. At some point, however, encryption of all pieces under one KFpub key may become prohibitive when considering the size of that one key.

Further in step 1312, the sending program 1018 generates a leaf verification string LVS that is equal the concatenation of KS1 and KS2. The encrypted leaf verification string ELVS is then generated and is equal to the LVS encrypted using the session key KS.

In step 1314, C, LEAF, and ELVS are sent to the receiving program 1026.

Figure 14:
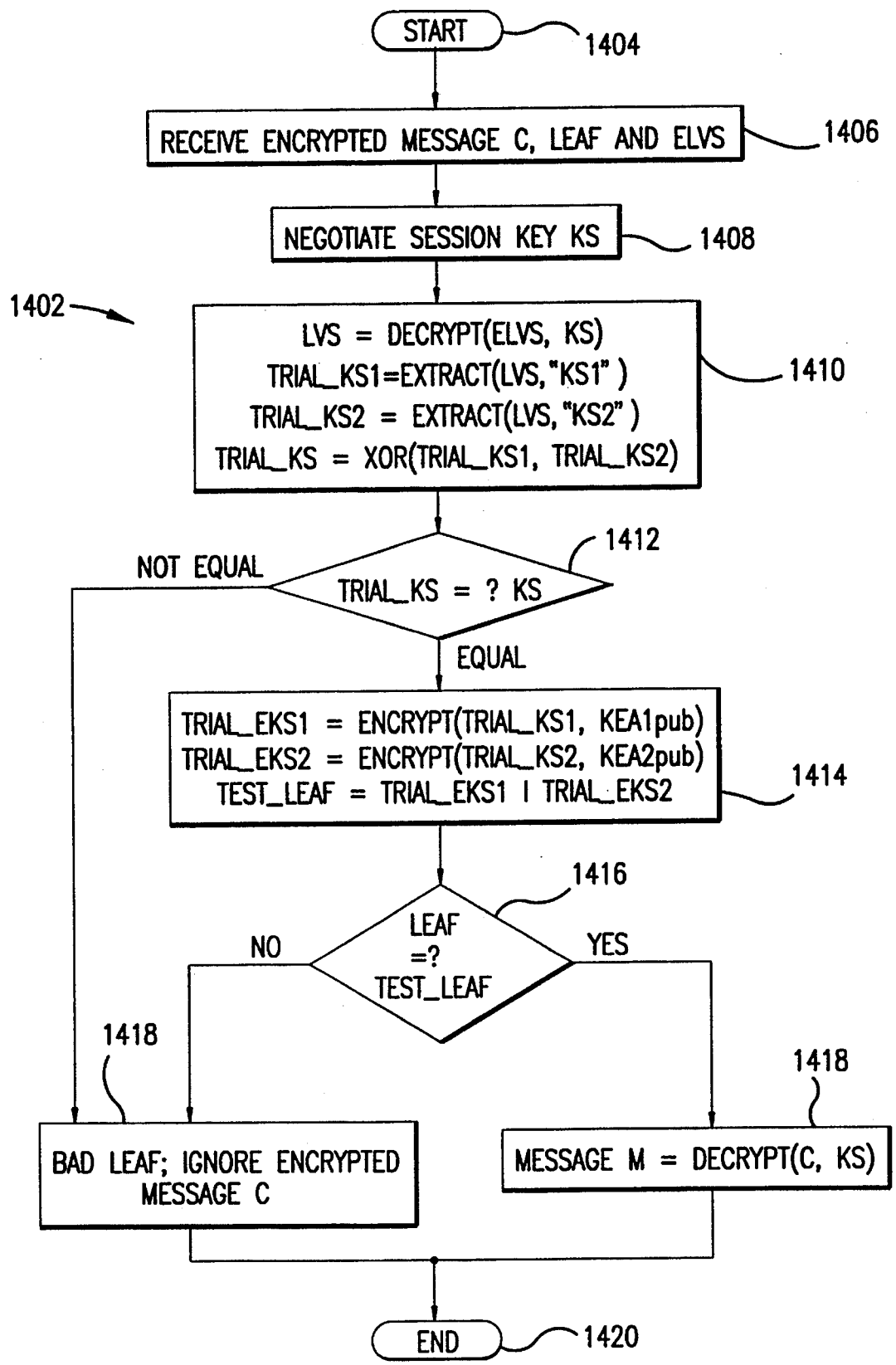

The operation of the receiving program 1024 is shown in a flowchart 1402 of FIG. 14. In step 1406, the receiving program 1024 receives C, LEAF, and ELVS from the sending program 1018. In step 1408, the session key KS is negotiated (this step corresponds to step 1308 in FIG. 13).

Then, the receiving program 1024 checks the leaf verification string LVS and then recomputes the LEAF. Specifically, in step 1410 the receiving program 1024 decrypts the encrypted leaf verification string ELVS using KS to obtain the leaf verification string LVS. The putative KS1 and KS2 called trial_KS1 and trial_KS2 are extracted from LVS. Then, the receiving program 1024 generates the session key KS (called "trial_KS" in step 1412) by exclusive-OR'ing trial_KS1 and trial_KS2 that were just extracted from LVS. In step 1412, the receiving program 1024 compares trial_KS with the negotiated session key KS. If they are not equal, then the LEAF is bad and the message is rejected (step 1418).

If they are equal, then in step 1414 the receiving program 1024 uses its copies of KEApub1 and KEApub2 to recompute the LEAF. This is done by encrypting trial_KS1 using KEApub1 and encrypting trial_KS2 using KEApub2 to thereby generate trial_EKS1 and trial_EKS2, respectively. Then, a LEAF called test_LEAF is computed by concatenating trial_EKS1 and trial_EKS2.

In step 1416, the receiving program 1024 determines if trial_LEAF is equal to the LEAF. If they are not equal, then the message is rejected (step 1418). If they are equal, then the LEAF is validated and the message M is decrypied using KS.

Figure 15:
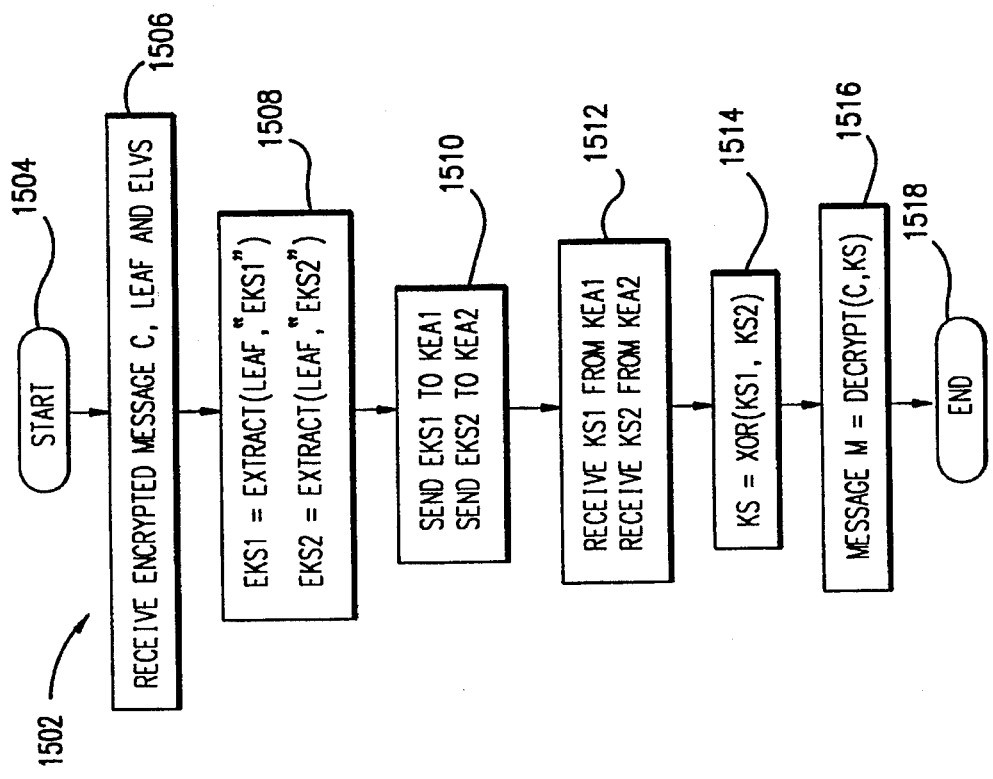

The operation of the law enforcement decryplot LED 1016 is shown in a flowchart 1502 of FIG. 15. In step 1506, the LED 1016 receives the C, LEAF, and ELVS from the sending program 1018. In step 1508, EKS1 and EKS2 are extracted from the LEAF. In step 1510, the LED 1016 sends EKS1 to key escrow agent (KEA) 1006 and sends EKS2 to KEA 1010. Also, the LED 1016 discloses a proper court order to each escrow agent 1006, 1010. Each agent 1006, 1010 verifies the validity of the court order, records its effective dates, and generates a secret key half KS1 or KS2 using either KEA1priv or KEA2priv for that particular court order and issues it to the LED 1016. This is represented by step 1512, where the LED 1016 receives KS1 from KEA1 1006 and KS2 from KEA2 1010. The LED 1016 combines the returned KS1 and KS2 to yield KS (step 1514), and decrypts the message using KS (step 1516).

Any submission of key parts for that wiretap to an escrow agent 1006, 1010 by the LED 1016 must be encrypted in the corresponding key. The escrow agents 1006, 1010 delete the secret keys KS1, KS2 on the expiration of the court order and are therefore unable to comply with any requests for keys after the expiration of the order. Since all communications with the escrow agents 1006, 1010 must be encrypted for security, this process adds no execution time to that operation.

Figure 16:
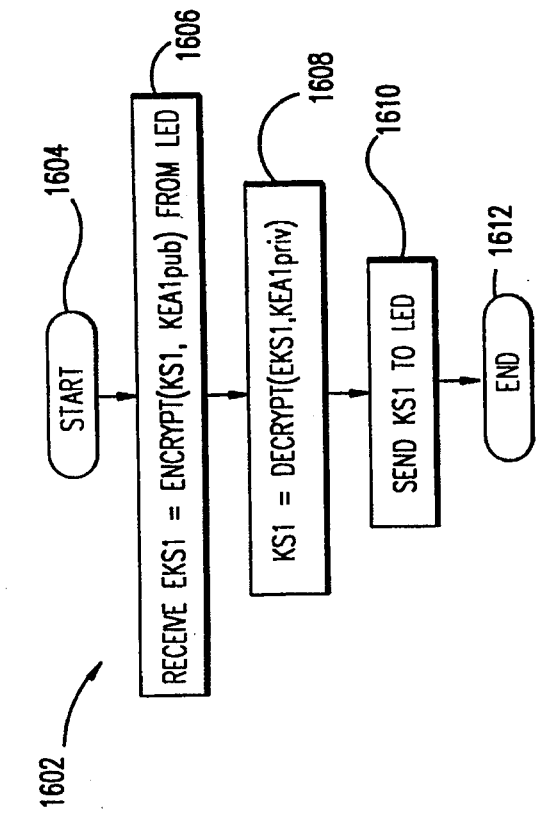

The operation of KEA1 1006 is shown in a flowchart 1602 in FIG. 16. KEA1 1006 and KEA2 1010 are identical, so the following description applies equally well to KEA2 1010. In step 1606, the KEA 11006 receives EKS1 from the LED 1016. In step 1608, the KEA1 1006 decrypts EKS1 using KEA1priv to obtain KS1. In step 1610, the KEA1 1006 sends KS1 to the LED 1016.

Since there is no database linking a UIP to any individual targeted in a court order, the escrow agents 1006, 1010 have no choice but to trust the LED 1016's association of an individual targeted by a court order with a specific wiretap. The protocol described above may be modified to include a UIP in the LEAF portions sent to the escrow agents 1006, 1010, to enable those agents 1006, 1010 to maintain a list of program instances targeted under each court order for later auditing.

This second embodiment has the advantage that there is no product unique key to be disclosed to the LED 1016. Once surveillance ceases, the LED 1016 has no further ability to decrypt the sending program 1018's communications unless it again requests the services of the escrow agents 1006, 1010. As a side effect, there is no potential for a rogue application to trick the LED 1016 into withdrawing the unique keys of innocent users.

This second embodiment requires the escrow agents 1006, 1010 to be on line and involved with every decryption of a new session key. This is not considered to be a disadvantage since the escrow agents 1006, 1010 are committed to round-the-clock operation as part of the Clipper initiative. Online computer systems at the escrow agents can be expected to respond within 0.2 seconds, provided they have hardware support for public key decryption, and reliable communications between escrow agents and LED should be easy enough to provide.

3. Third Embodiment—Data Recovery Centers

A third application of this technology applies to Data Recovery Centers (DRCs). This third embodiment is directed to the provision of emergency access to stored encrypted data in the event of the loss of the normal decryption key. It involves no key escrow or escrow agents and has no communications with third parties (specifically any DRCs) except during an initial, registration phase and during the process of emergency access.

This embodiment is similar to the second embodiment where no databases of escrowed keys and therefore no escrowed keys and escrow agents exist. This embodiment, like the second embodiment, is directed towards decryption services. In the second embodiment, directed to law enforcement interests, the entities performing the decryption services were called Escrow Agents, even though they performed no escrow functions. In this embodiment, to appeal to corporate and individual interests, the entities performing the decryption services are named the DRCs.

Figure 19:
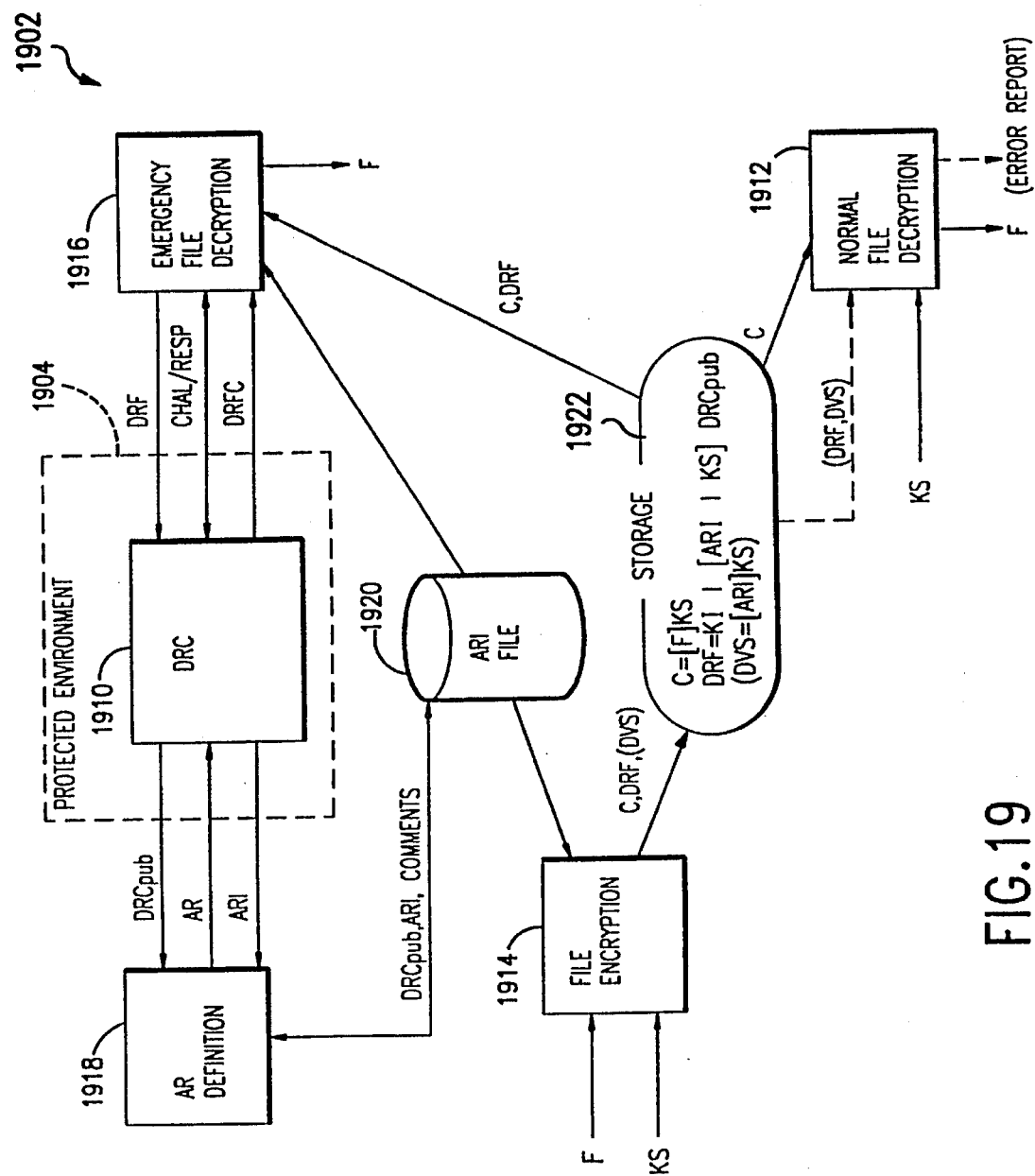
FIG. 19 is a block diagram of a data escrow cryptographic system according to a third embodiment of the present invention.

FIG. 19 illustrates a block diagram of an environment 1902 according to this third embodiment. The environment 1902 includes a data recovery center (DRC) 1910 (optionally redundant) situated in a protected environment 1904. The protected environment 1904 is established and maintained by any entity wishing to provide services pursuant to the third embodiment of the present invention (as described herein). For example, the protected environment 1904 may be established and maintained by a public organization (such as a state division of motor vehicles) or a private organization (such as a corporation), or a plurality and/or combination of public/private entities. Preferably, the DRC 1910 represents software executing on a suitably equipped computer system.

Functional elements 1912 (normal file decryption), 1914 (file encryption), 1916 (emergency file decryption) and 1918 (AR definition) represent a user in the four different operational modes. In the following description, the four elements will be referred to as the normal decrypting user, the encrypting user, the emergency decrypting user, and the AR defining user respectively. It should be understood that these users do not necessarily represent the same party.

In this embodiment, the AR defining user 1918 first negotiates with the DRC to obtain a DRC public key (DRCpub). The AR defining user 1918 then creates an access rule (AR) definition and registers that AR definition with DRC 1910. The DRC 1910 sends an access rule index (ARI) corresponding to that AR back to the AR defining user 1918. The AR defining user 1918 then stores any new DRCpub, the new ARI and an attached comment in the AR file 1920.

The encrypting user 1914 encrypts a File F with a storage key (KS) to generate an encrypted file C=[F]KS. The encrypting user 1914 is any entity wishing to encrypt data and store such encrypted data. For example, the encrypting user 1914 may be a commercial software program (such as a word processor program, a spreadsheet program, a database program, a communication program, etc.) running on a computer.

The encrypting user 1914 creates a data recovery field (DRF) comprising an access rule index (ARI) and the KS encrypted by DRCpub. The ARI and DRCpub values are retrieved from the ARI file 1920. The ARI value is generated by the DRC 1910 during the initial set-up phase between the AR defining user 1918 and the DRC 1910. The DRF is attached to the encrypted message C and is sent by the encrypting user 1914 to a storage medium 1922. If it is desired to allow for reconstruction of the DRF during a later verification phase, the encrypting user 1914 also generates a DRF Verification String (DVS) and attaches it to the DRF. The (optional) DVS consists of the ARI which was used in the DRF, encrypted in the storage key, KS.

In this third embodiment, the encrypted message and the DRF are stored in a storage medium 1922 pending retrieval by either the normal decrypting user 1912 or the emergency decrypting user 1916. Typically, the normal decrypting user 1912 is the same person as the encrypting user 1914 who has access to the storage key, KS, without requiring any reference to the DRC.

An emergency access situation occurs when an emergency decrypting user 1916 does not have the KS required to decrypt the message. For example, this may happen in a corporate environment when a manager needs access to data encrypted by an employee, but the employee is not present and the manager does not know the employee's storage key, KS. It may also happen when the encrypting user 1914 forgets KS or the normal means for generating it or gaining access to it. To access the KS, the emergency decrypting user 1916 extracts the DRF from the storage medium 1922 and sends it to the DRC 1910. The DRC 1910 responds with a challenge previously defined by the AR defining user 1918 at the registration phase and selected by the encrypting user 1914 during encryption and releases the KS contained within the associated DRF to the emergency decrypting user 1916 if the emergency decrypting user 1916 successfully meets the challenge. In this scenario, the emergency decrypting user 1916 can generally be described as a party privileged to the information originated by the encrypting user 1914 (e.g., management).

From a broader perspective, the KS within the DRF could represent any confidential piece of information to which the encrypting user 1914 desires to control access. In other words, the intended use of the KS after retrieval by an emergency decrypting user 1916 does not limit the scope of use of this embodiment.

Preferably, the data recovery center 1910, the client 1918, and the user 1916 each represent a data processing device operating according to instructions or commands from a controller. (In some embodiments, the data processing device includes a processor, in which case the processor operates according to instructions or commands from the controller.) In one embodiment, the controller represents a hardware state machine. In an alternate embodiment, the controller represents a computer program in an electronic/magnetic form that is directly readable by a computer. Preferably, the computer program is distributed as a computer program product (such as a floppy disk having control logic electronically or magnetically recorded thereon), or via a communications network.

3.1 Data Recovery Field

Where the first two embodiments refer to a Law Enforcement Access Field (LEAF), the third embodiment refers to a Data Recovery Field (DRF). Since emergency access is provided only to emergency decrypting users 1916 in this embodiment (e.g., an encrypting user 1914 himself or his employer), the preferred mode of this embodiment avoids the splitting of KS. Clearly, in alternative modes, key splitting remains a possible implementation should an encrypting user 1914 desire it.

It should be noted that in alternative embodiments KS need not be a storage key (i.e., encrypting key). The datum inside a DRF can be any datum which the encrypting user 1914 wishes to encrypt and store. The enclosure of such a datum inside a DRF is functionally equivalent to the encryption of that datum in a file with a storage key (KS) generated at random. The randomly generated storage key (KS) is included within the DRF attached to the file and forces the file's owner to access the file's contents as an emergency decrypting user 1916.

Further comparison to the second embodiment is evident through consideration of a LEAF with n=1 and no KFpub encryption. For this example, the LEAF is comprised of $[KS_1]EApub_1$ where [Y]X means Y, encrypted with key X. In comparison, the DRF of the third embodiment is comprised of [ARI|KS]DRCpub. Here, the index to an access rule (AR) defined by an encrypting user 1914 is concatenated with the storage key (KS) chosen by the encrypting user 1914 and then encrypted in the public key of the DRC, DRCpub. If the encrypting user 1914 views the DRC 1910 as potentially hostile, an alternate embodiment implements a DRF comprising: $[ARI_1,KS_1]DRCpub_1,[ARI_2,KS_2]DRCpub_2, \ldots , [ARI_n,KS_n]DRCpub_n$ In this alternate embodiment, at least k of the n $KS_i$ pieces need to be obtained to recover KS and the n DRCs 1910 are disjoint and not subject to conspiracies of more than (k−1) parties. This splitting of KS into shares is accomplished via any well known secret-sharing mechanism. An example of such a secret-sharing mechanism is described in A. Shamir, "How to Share a Secret", in the Communications of the ACM, vol. 22, no. 11, pp. 612–613, Novmber 1979, incorporated herein by reference in its entirety.

Finally, since the DRF provides the encrypting user 1914 himself with a service, there is no need to strongly enforce its correct construction. The encrypting user 1914 is not inclined to circumvent a service he desires, uses voluntarily and possibly paid some amount of money to acquire. In addition, any refusal to decrypt (as in the first two embodiments) based on an incorrect DRF is an inappropriate action for storage encryption. The damage of a bad DRF is done at the time of encryption and detection of an incorrect DRF at decryption time is ineffective. Therefore, in a preferred embodiment, either no DRF verification or verification in the form of a background "sniffer" is implemented. As further described below, a "sniffer" is a process which randomly selects files, checks their DRF formats (using a format-checking service provided by the DRC 1910) and in case of incorrect format, notifies the creator of the file (and possibly his manager) of the flaw. This provides moderate social or administrative pressure at or shortly after encryption time to remedy a failure to generate proper DRFs. The generation of improper DRFs can happen by accident or oversight rather than by malicious intent.

3.2 DRF Verification

It is possible that an encrypting user 1914, without any intended malice, uses a version of software which doesn't attach DRFs to files (possibly because that option isn't enabled at the time), or which mistakenly attaches (through a flaw in the software) an incorrect DRF, or which incorrectly constructs DRFs. Several options exist for detecting such problems and minimizing the extent of the potential damage from them. These options (described below) include sniffing for format, random re-building of DRFs, random verification by the DRC 1910, and doing nothing, i.e., performing no verification (the no verification option is discussed above). Since accessing DRFs is a very infrequent occurrence, any time delay in detecting bad DRFs is likely to be less than the time until the DRF is needed, thus permitting the encrypting user 1914 time to recreate a proper DRF.

3.2.1 Sniffing for Format

It is good practice in general to have a file "sniffer" program which scans storage devices (such as storage device 1922), reading records and possibly encountering bad blocks. Disk storage can go bad without being read and a bad block is not detected until it is read. If detection is delayed for too long after the data is written, backup copies of that data might also have gone bad. A "sniffer" attempts to find such blocks before their backup copies go bad.

A "sniffer" can operate in conjunction with the DRC 1910 by checking not only for bad data blocks but also for bad format DRFs. This background process should not, for security reasons, have access to the bits of the encrypted files. For example, in one embodiment, the files and the "sniffer" process could reside on a commercial file server not under the control of the company or person who owns the data. The "sniffer", however, can select DRFs from files (having been modified to recognize their existence) and send them to their respective DRCs 1910, getting back from the DRC 1910 a boolean answer indicating whether the DRF is encrypted properly or not. This detects improper DRF format or lack of a DRF within an encrypted file.

In an alternate embodiment, where a DRC 1910 is overwhelmed by work from such "sniffing", the "sniffer" can be programmed to select a pseudo-random number and use that value to control whether to verify a particular DRF with the effect that only some percentage of the DRFs encountered are verified. That percentage can be varied to adjust the work load presented to the DRC 1910. If the DRC 1910 replies that a DRF is bad, either it or the "sniffer" (or both) could generate an audit log entry and notify the file's owner (and possibly others in the owner's management chain) of the error. Maintenance of lists of persons to notify and methods of delivering that notification are commonly understood programming practices and are not described here in greater detail.

3.2.2 Random re-building of DRFs

The "sniffer" cannot verify that the storage key (KS) inside a DRF is valid because it does not have access to KS or to the private key necessary to decrypt the DRF. If a DRF is of the form that is re-built (by using the public key algorithm to build the DRF directly, rather than by having the public key algorithm encrypt a secondary storage key, $KS_2$, which is in turn used to encrypt the DRF contents), and if the encrypting user 1914 has attached a DRF Verification String (DVS), then the emergency decrypting user 1916/program can verify the DRF by rebuilding it. In the event of detection of error through this process, the normal decrypting user 1916/program would generate an audit log entry and, in one embodiment, send messages (through whatever preferred means) to the file's owner and other in the corporate management. Unlike the communications case of the earlier embodiments, however, it is not proper to refuse to decrypt in this circumstance. Refusal to decrypt stored data implies loss of access to that data and it is preservation of access to data that the DRC 1910 is intended to provide.

Since this rebuilding is a time-consuming operation and since the purpose of this re-building is to make the encrypting user 1914 more vigilant about the software being used, one embodiment envisions that the decrypting software re-builds only a randomly selected percentage of all DRFs. It is expected that the knowledge that this re-building occurs occasionally is enough to increase encrypting user 1914 vigilance.

3.2.3 Random verification by the DRC

In alternative embodiments, the DRF formats do not permit re-building. Even these formats, however, can be verified by the decrypting program, but the DRC 1910 must participate in the verification process. For this reason, this DRF format might be randomly selected for verification with a much lower percentage than any other kind.

In one embodiment of verification involving the DRC 1910, the encrypting user 1914 obtains an emergency access decryption of the file and verifies that the process works. In another embodiment, interaction between the encrypting user 1914 and the DRC 1910 is reduced during verification. In this embodiment, the decrypting program, after obtaining a storage key (KS) and decrypting the file, sends that KS and the DRF together to the DRC 1910, asking the DRC 1910 only to decrypt the DRF and reply whether the KS that was sent and the KS inside the DRF's datum are identical.

Access rule challenge and response is not required in this case because as a method of gaining access to a file by an outsider, this method amounts to a brute force key test but one in which each test involves communications costs and is therefore slow and not subject to improvement with improvements in the speed of VLSI circuitry. It is therefore slower than alternate methods of attack and therefore not an increased security risk.

3.3 Access Rules

There are two kinds of access rules (ARs) defined by the present invention, basic authentication tests and compound authorization rules. An AR is specified by the AR defining user 1918 who defines it and sends it to the DRC 1910. In response, the DRC 1910 grants the AR defining user 1918 an access rule index (ARI). The encrypting user 1914 can then use the ARI to include in a DRF or the AR defining user 1918 can use the ARI in the definition of other ARs. This interaction between the AR defining user 1918 and the DRC 1910 is called the registration phase and is described in greater detail below. The DRC 1910, in turn, uses an ARI to locate the associated AR and uses that rule to control challenges to the emergency decrypting user 1916 to determine the decrypier's right to access.

An authentication test is an example of a relatively simple AR. If the emergency decrypting user 1916 passes the test, then the emergency decrypting user 1916 gains access. More generally, the emergency decrypting user 1916 receives either access or a success token, which is used to respond to other challenges. A compound authorization rule, on the other hand, specifies a group of ARIs, some (or all) of which need to be satisfied in order for the AR to be satisfied.

3.3.1 Authentication Tests

In one embodiment, a basic authentication test includes a method for proving one's identity. In particular, it can include shared secrets (e.g., mother's maiden name), cryptographic authentication protocols, third party endorsements (e.g., verification that the person presenting data to be validated possesses a pre-specified driver's license and matches the picture, description and signature on that license), biometric tests (e.g., retnal scans), or any other authentication.

Additional authentication tests include multiple prompt/reply pairs. In a multiple prompt/reply pair, an AR defining user 1918 can specify a list of N prompts and their associated replies. The AR defining user 1918 also specifies the numbers A and K ($K \leq A \leq N$) such that when the DRC 1910 employs the authentication test, it randomly selects A of the N prompts to challenge the emergency decrypting user 1916. The emergency decrypting user 1916 attempts to provide correct replies to all selected prompts. If the emergency decrypting user 1916 gets K or more replies correct, the authentication test is satisfied. This variation of a shared secret test is provided for emergency decrypting users 1916 who may have trouble remembering a particular typed string but who might remember K of A of them with greater probability.

Finally, in a preferred embodiment of authentication by shared secret, confidentiality is provided for the reply portion. Specifically, instead of storing the reply as a readable text string, during both registration and responses to challenges a cryptographically strong hash of the prompt and reply is formed. This hash value is ASCII encoded and sent to the DRC 1910 as the reply string. This confidentiality permits an AR defining user 1918 to employ embarrassing memories as a reply on the theory that such memories are unlikely to be either forgotten or shared.

3.3.2 Authorization Rules

In one embodiment, a compound authorization rule takes the form:

[n, k, ARI1, ARI2, ... , ARIn]; $k \leq n$

This rule is satisfied if k of the n ARIs given are satisfied. The ARs referenced by these ARIs may be created by the AR defining user 1918 or by other persons known to the AR defining user 1918. For example, an AR can be created to represent the authorization rule for a company's corporate emergency access and the ARI can be listed as an optional emergency access method for each employee.

In particular, if the corporation had a corporate ARI=c, and the employee had an individual ARI=e, the employee could create and use an ARI=u defined as u=[2, 1, e, c]. Through this definition, any file which included "u" as the ARI in its DRF is available in case of emergency by satisfying the ARI of either the employee or the corporation.

It should be noted that a group with n=k is equivalent to a logical-AND of the group's rules thus implying that all ARIs must be satisfied. Similarly, a group with k=1 is equivalent to a logical-OR of the group's rules meaning that any one of the ARIs must be satisfied. A group with n=1 and k=1 is an ARI that indirectly references another ARI.

3.4 Use of DRC Access to Implement Data Escrow

The emergency access provided by a DRC 1910 does not take the place of normal access to an encrypted file. It is assumed that the normal access to a storage key (KS) proceeds without paying attention to the DRF. In this situation, the normal decrypting user 1912 is the same person as the encrypting user 1914 and has knowledge of the storage key (KS) or of a method of obtaining KS independent of the DRC 1910. Thus, in most cases the DRC 1910 will never know that the encrypting user 1914 has even created the DRF for a file. However, this invention permits a new kind of storage encryption in which the storage key is chosen randomly (e.g., by the encrypting program). Consequently, in this embodiment, the only method of access is via the emergency use of a DRF. By proper definition of ARs, this option permits an encrypting user 1914 to implement a data escrow mechanism in which the grantee of the data would hold it at all times in encrypted form, and would receive use of that encrypted data only upon the satisfaction of a potentially complex AR. No individual person, not even the data's original encrypting user 1914, would be able to decrypt it without satisfying that AR. To implement this option, one needs only a trusted DRC 1910 that would never release a decrypied DRF except upon satisfaction of the corresponding AR. In addition to the description of a DRC 1910 below, a DRC 1910 may be encased in a tamper-resistant enclosure and have no override access defined. In one embodiment, the trusted DRC 1910 is highly fault-tolerant through redundancy.

3.5 Overide Access

In some embodiments, an override access is provided. Specifically, in response to any challenge from the DRC 1910 for satisfaction of an AR, the challenged emergency decrypting user 1916 may respond "override". The emergency decrypting user 1916 is then challenged according to an override AR defined for that DRC 1910. For example, the override AR could require that 3 of 5 previously designated company officers agree to override. The definition of such a policy is via the access rule mechanism described earlier (and further described below). The same effect is also achieved by having the AR defining user 1918 always define and use a compound authorization rule as described earlier (e.g., u=[2, 1, e, c]). However, the override mechanism saves the AR defining user 1918 time in registration and provides a guarantee that a supervising entity (such as management) will be allowed access to all files, independent of any actions on the part of any employee.

3.6 Operation of the DRC

Use of the emergency access capability provided by the DRC 1910 involves several separate steps:

(1) Registration,
(2) Listing of Defined ARIs,
(3) Creation of DRFs,
(4) Emergency Access Requests,
(5) Challenge-Response Protocol, and
(6) Receipt and Use of Decrypied DRF Data.

In addition to these steps, it should be noted that information to and from the DRC 1910 is frequently confidential and therefore, in a preferred embodiment, the implementation of the DRC 1910 includes encryption of all transactions between the DRC 1910 and the users 1916 and 1918. For that purpose, the DRC's public key (DRCpub) is used to communicate a randomly chosen session key from the AR defining user 1918 (or the emergency decrypting user 1916) to the DRC 1910. In addition, the AR defining user 1918 (or the emergency decrypting user 1916) includes inside the encrypted request to the DRC 1910, which reply key the DRC 1910 should use for the return message. In addition to confidentiality, there is also the question of authentication. Since an AR defining user 1918 defines himself by providing AR definitions during registration, there is no further AR defining user 1918 authentication needed for the DRC 1910/AR defining user 1918 communication.

The DRC 1910 itself, however, requires authentication by well known public key methods. This is accomplished through widespread publication of the DRC's public key using a variety of channels or signatures on the DRC's public key by a key which is either widely known or trusted (or both). If the AR defining user 1918 uses an untrusted DRC public key, then the AR defining user 1918 is vulnerable to improper behavior by the DRC 1910 and will be unable to provide convincing evidence identifying that DRC 1910 for the purposes of legal remedy.

3.6.1 Registration

Figure 20:
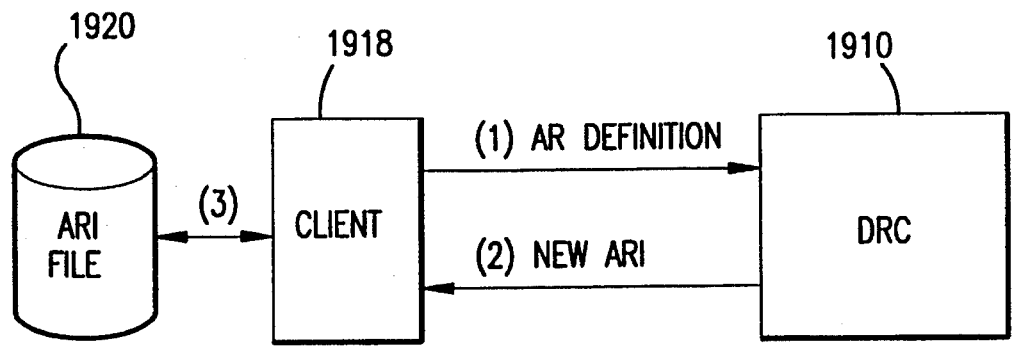
FIGS. 20, 24 and 26 are data flow diagrams depicting the process of access rule definitions.

DRC 1910 registration (i.e., having an AR defining user 1918 register with a DRC 1910) involves the creation of ARs and acceptance by the AR defining user 1918 of an access rule index (ARI) for each AR. FIG. 20 illustrates generally the AR definition process between an AR defining user 1918 and DRC 1910. In this overview, the AR definition process comprises the following steps: (1) the AR defining user 1918 sends an AR definition to the DRC 1910, (2) the DRC 1910 sends a new ARI to the AR defining user 1918, and (3) the AR defining user 1918 files the new ARI with an optional explanatory comment in the ARI file 1920.

The ARI is a value created by the DRC that allows the DRC to locate the AR definitions corresponding to the ARI. In a preferred embodiment, the ARI contains an address at which the AR definitions are stored.

Figure 21:
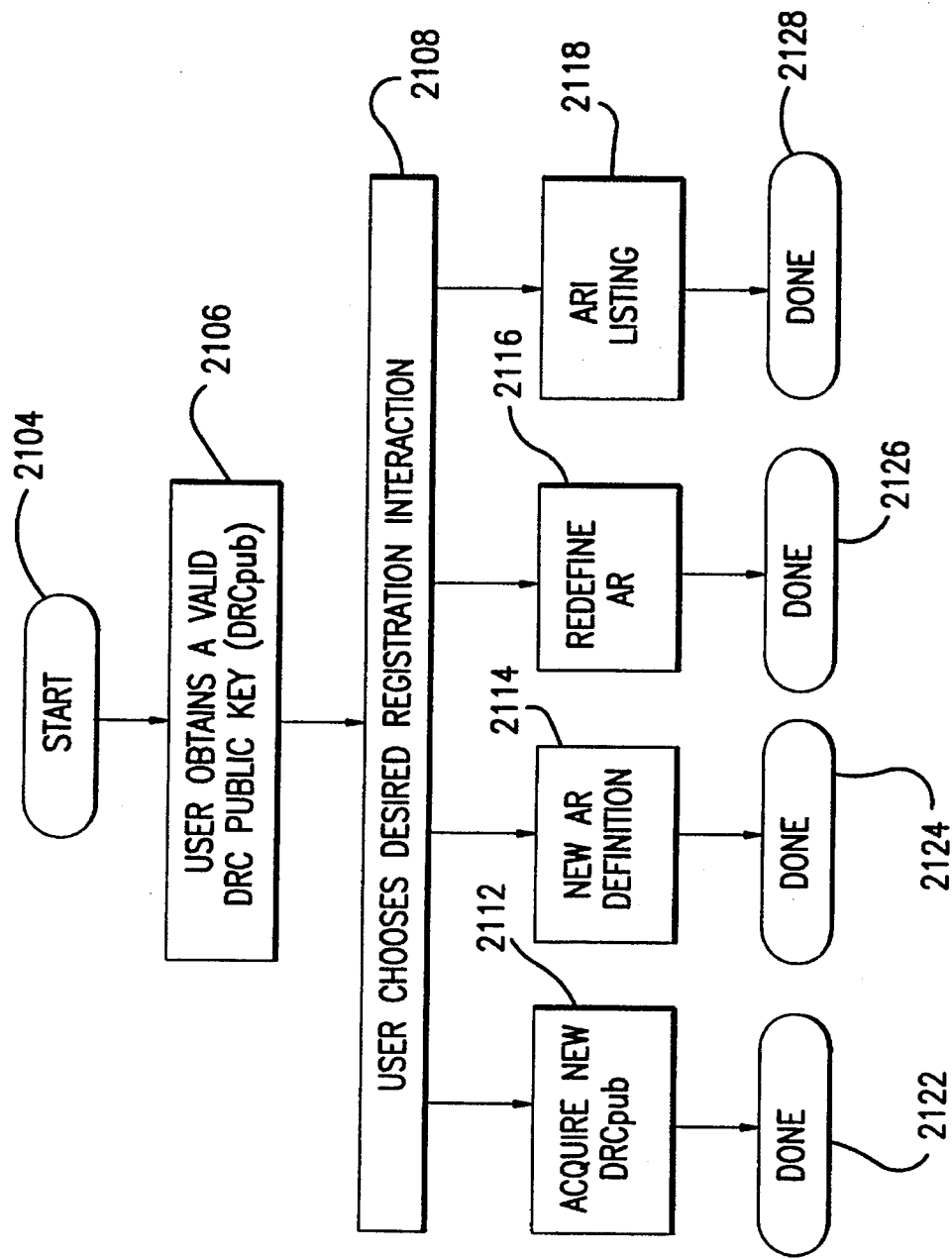

The registration process is further represented by a flow-chart in FIG. 21. In step 2106, the AR defining user 1918 obtains a DRC public key (this step is described in Section 3.6.1.1). In step 2108, the AR defining user 1918 chooses the desired registration interaction. These registration interactions include the acquisition of a new DRCpub in step 2112, creating a new AR definition in step 2114, redefining an existing AR in step 2116, and obtaining an ARI listing in step 2118. The acquisition of a new DRCpub is described in section 3.6.1.1, the creation of a new AR is described in sections 3.6.1.2, 3.6.1.4, 3.6.1.5 and 3.6.1.6, the redefinition of an existing AR is described in section 3.6.1.3, and the obtaining of an ARI listing is described in section 3.6.2.

3.6.1.1 Acquisition of DRCpub

The initial DRC public key, here labeled DRCpub(0), is available from advertising publications or through messages from other people. The security of further public key distribution hinges on the trustworthiness of this initial key because public key authentication techniques can not establish absolute trust. Rather they can establish only equivalency of trust.

The DRC 1910 generates new DRC public keys from time to time, in order to minimize the volume of data which achieves emergency access under any one key. The greater the volume that can be accessed under one key the greater the temptation for an adversary to attempt to break that particular key The DRC 1910 retains all generated DRC public-key/private-key pairs, so that an emergency decrypting user 1916 can initiate a secure communication using any of the DRCpub keys.

After a trusted DRC public key is obtained by an AR defining user 1918, the DRC 1910 returns a signed version of that DRC public key to the AR defining user 1918 (step 2106 in FIG. 21). The most current DRC public key is returned in every DRC 1910 interaction with any AR defining user 1918 as a text block appended to the DRC's normal message. On a special request by the AR defining user 1918, wherein the AR defining user 1918 sends the number "i" (desired key number) and "k" (old key number), the DRC 1910 will return the new key, DRCpub(i), signed by a prior key, DRCpub(k), of the encrypter's choice.

3.6.1.2 Creation of a new Access Rule

FIG. 22 illustrates tile process of creating a new AR that begins with step 2206 where an AR defining user 1918 sends an AR definition to the DRC 1910 which records that definition. In step 2208, the DRC 1910 returns an ARI to the AR defining user 1918. The AR defining user 1918 receives this ARI in step 2210 and, after attaching an optional descriptive comment provided by the AR defining user 1918, appends the ARI record to the ARI file. The ARI file already contains the DRCpub and ally other ARIs which the AR defining user 1918 has already acquired.

3.6.1.3 Re-definition of an existing Access Rule

FIG. 23 illustrates the process wherein an AR defining user 1918 desires to change the definition of an existing AR. Although an AR defining user 1918 is free to generate new ARs at will, a re-definition is required when there already exist files encrypted under a given ARI and the AR defining user 1918 decides to change the emergency access procedure for those existing files. To perform this re-definition, the AR defining user 1918 in step 2306 sends to the DRC 1910 the new AR definition and also the ARI corresponding to the AR to be defined. The AR defining user 1918 is then challenged by the DRC 1910 in step 2308 with the ARs attached to the old ARI. If the AR defining user 1918 fails the challenge issued by the DRC 1910, the redefinition request is denied in step 2110. If the AR defining user 1918 successfully meets the challenge the AR defining user 1918 is allowed to change the AR definitions for that ARI in step 2312. For the embodiment where the DRC 1910 records an AR defining user's 1914 network address with each defined ARI, the request for re-definition must come from that network address.

3.6.1.4 Third Party Access Rules

Figure 24:
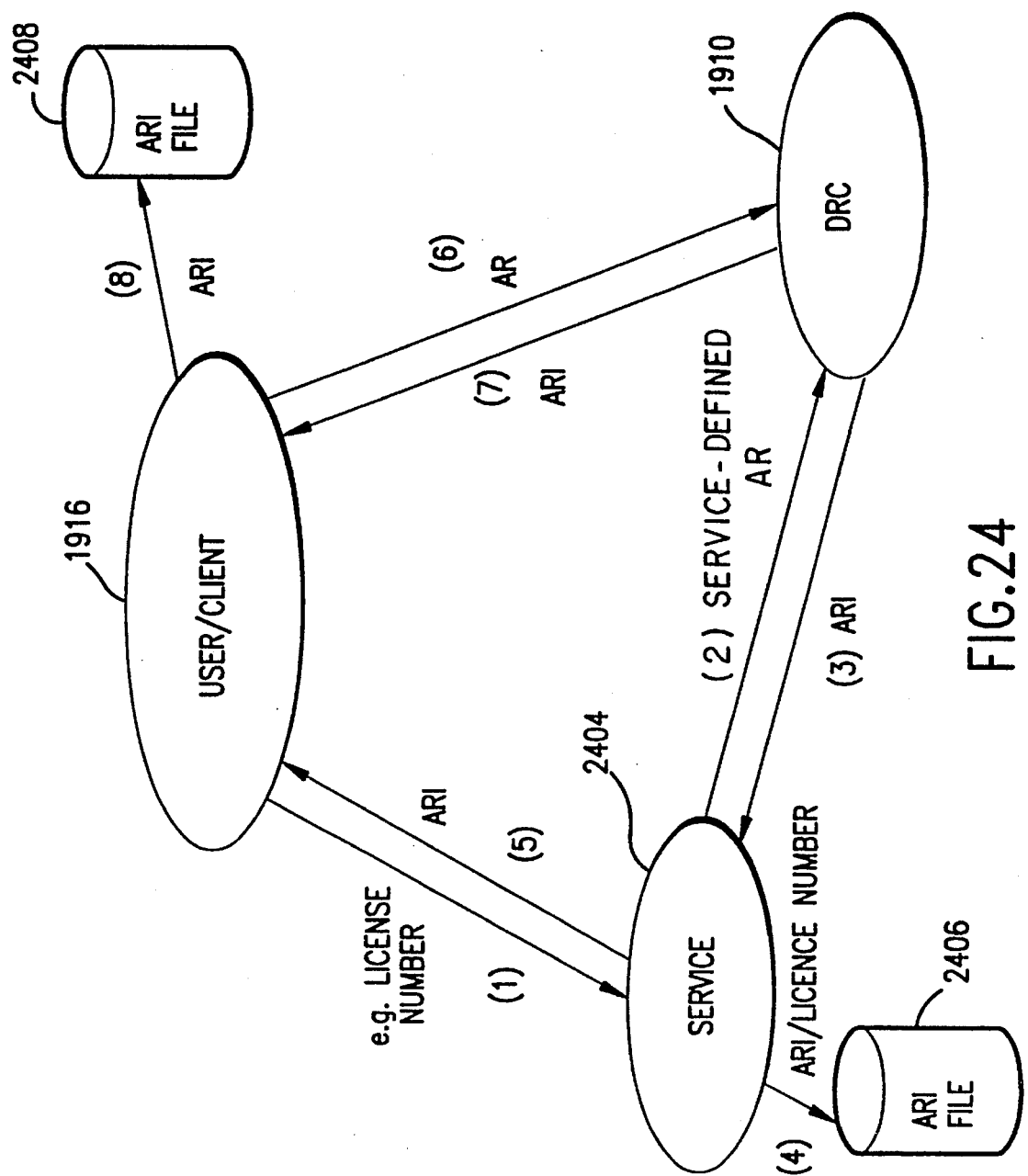

There are, from the AR defining user's 1914 point of view, third-party authentication rules built using the normal authentication tests and group rules. For example, an AR defining user 1918 might register with some human-staffed service to get authentication by the AR defining user's 1914 driver's license or any biometric measure (e.g., palm print, retnal scan, etc.). As shown in FIG. 24, that service (1) receives the AR defining user's 1914 license number (without requiring an in-person visit) and (2) generates an AR which only the service 2404 could successfully satisfy, (3) receiving an ARI for it, in return. The service 2404 next (4) attaches the resulting ARI to a record of the AR defining user's 1914 license number in the service's ARI file 2406 and then (5) gives the resulting ARI to the AR defining user 1918. The AR defining user 1918 would (6) make an indirect AR to that ARI (the indirect AR definition is described in more detail below), (7) get an ARI for that new AR, and (8) file that ARI (now owned by the AR defining user 1918 rather than the service 2404) in the ARI file 2408.

3.6.1.5 Definition of an Authorization (group) Rule

Figure 25:
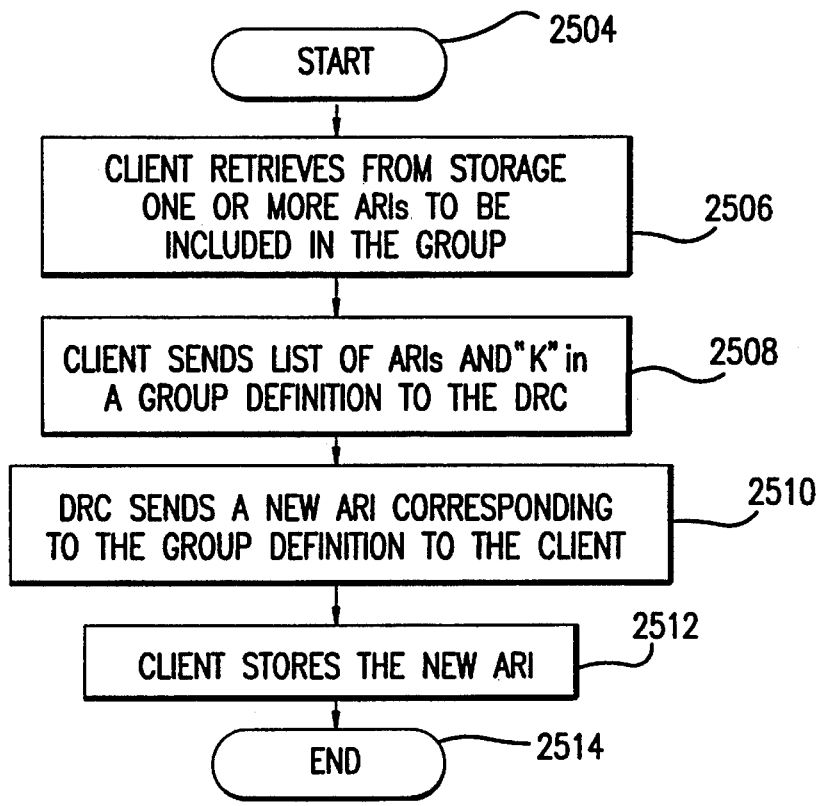

FIG. 25 illustrates the process of generating a group authorization rule. First, in step 2506, an AR defining user 1918 retrieves from his own ARI file one or more ARIs to be included in the group. The AR defining user 1918 sends that list in a group definition to the DRC in step 2508, along with a number "K" indicating the number of group elements that must be satisfied to satisfy the group, and receives from the DRC 1910 an ARI corresponding to that group in step 2510. Finally, in step 2512, the AR defining user 1918 stores the new ARI in the client's ARI file.

3.6.1.6 Creation of an Indirect Access Rule

Figure 26:
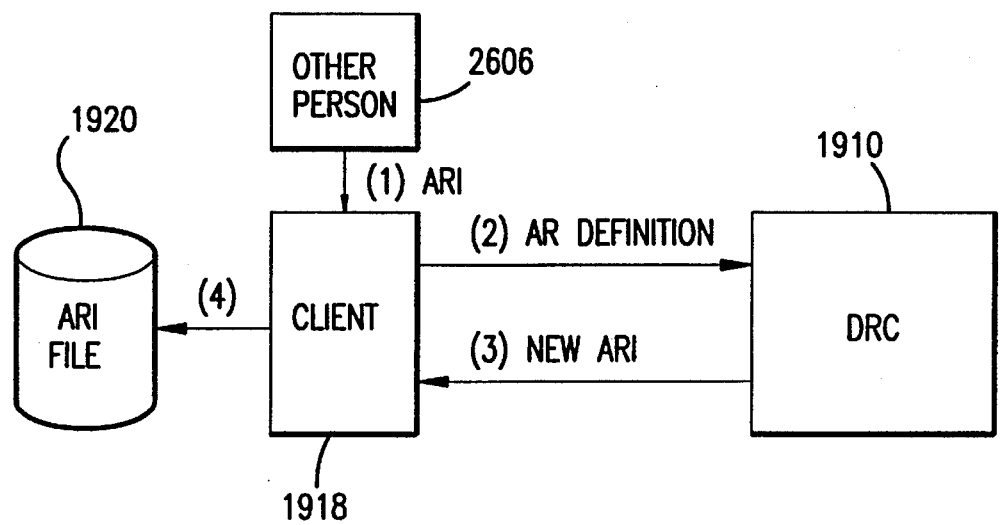

As shown in FIG. 26, the creation of an indirect AR proceeds similarly but refers to someone else's ARI. In that case, the other person's 2606 ARI would (1) arrive by some trusted communications channel rather than from the AR defining user's 1914 own ARI file 1920. The rest of the process (2)–(4) is the same as the AR definition process described above.

3.6.2 Listing of Defined ARIs

An AR defining user 1918 can also ask for a listing of the status of all ARs defined by that AR defining user 1918. In one embodiment, the identification of an AR defining user 1918 is by network address. In other embodiments, it could be by way of an AR and its ARI defined only for the purpose of identifying ownership of ARs or it could be whatever identification method is normal to the network or communications connection used by the DRC 1910. However, if a DRC 1910 is designed to mask network addresses, an ARI can also serve as an owner identifier. In this embodiment, the owner presents his identifying ARI while asking for a listing. The DRC 1910, would then challenge the owner to prove their identity (using the identifying ARI) and only then provide the listing.

3.6.3 Creation of DRFs

Figure 27:
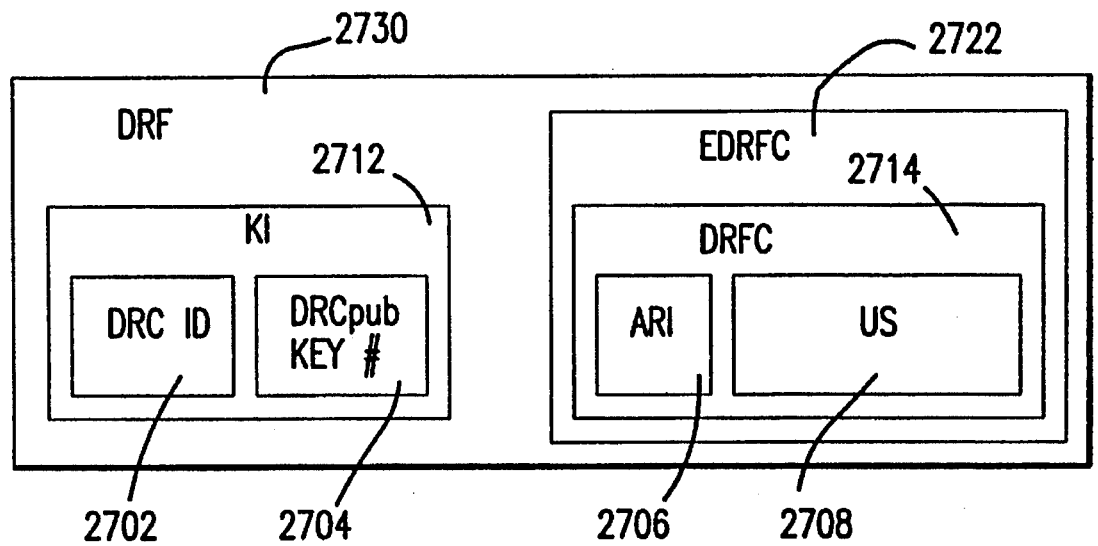
FIG. 27 is a preferred embodiment of the construction of a data recovery field.

FIG. 27 illustrates a preferred embodiment of the construction of a DRF 2730. In this embodiment an encrypting user's 1914 software creates a DRF 2730 by concatenating an ARI 2706 (selected by the encrypting user 1914, depending on which AR the encrypting user 1914 wants to use) and some small User's Secret [US] 2708. The US 2708 is often (but not limited to) a key for the symmetric encryption for a file (i.e., KS), but can be any data which the encrypting user 1914 wants to encrypt. This concatenation is called the DRF contents (DRFC) 2714. The DRFC 2714 is then encrypted using a DRCpub resulting in the Encrypted DRFC (EDRFC) 2722. The EDRFC 2722 is concatenated with the Key Identifier (KI) 2712 that uniquely identifies the DRCpub used to make the EDRFC 2722. In a preferred embodiment, the KI 2712 comprises a network address for the DRC [DRC ID] 2702 concatenated with a DRCpub key number 2704. An example of this KI 2712 is "drc@tis.com,4".

3.6.4 Emergency Access Requests

When an emergency decrypting user 1916 needs to decrypt a file whose storage key (KS) is available inside a DRF and the normal access to KS fails, he can use the DRF attached to the file. More generally, whenever the emergency decrypting user 1916 needs whatever small secret (i.e., US 2708) is held inside the DRF, the emergency decrypting user 1916 can issue an emergency access request to the DRC 1910.

Figure 28:
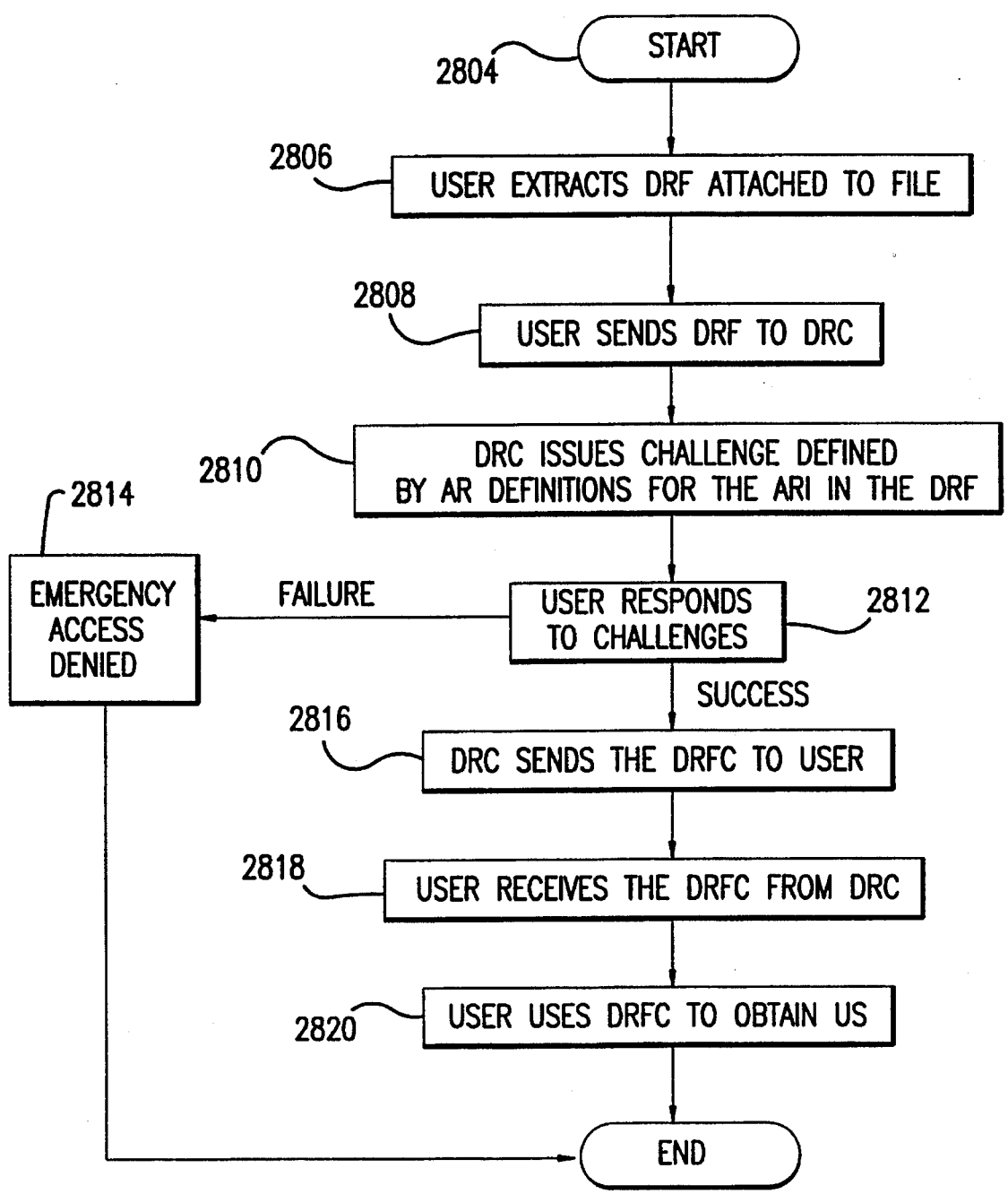
FIG. 28 is a flow chart depicting the processing of emergency access requests.

FIG. 28 illustrates the method of obtaining emergency access. First, in step 2806, the emergency decrypting user 1916 extracts from the storage medium 1922 the DRF that is attached to the file of interest (or the DRF alone if that is what is of interest) and then, in step 2808, sends the extracted DRF to the DRC 1910. In step 2810, the DRC 1910 issues a challenge defined by the AR definition for the ARI in the extracted DRF.

Figure 31:
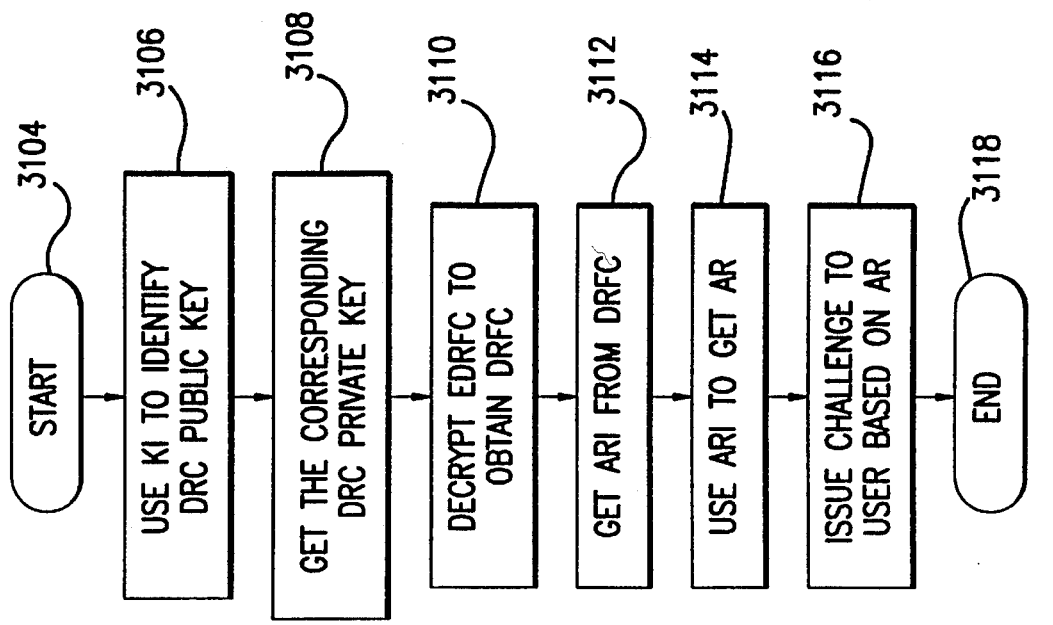
FIG. 31 is a data flow diagram depicting a retrieval of an access rule from a data recovery field.

FIG. 31 illustrates the processing steps performed by DRC 1910 in issuing the challenge to the emergency decrypting user 1916. First, in step 3106, the DRC 1910 uses the KI 2712 to identify DRCpub then retrieves, in step 3108, the DRC private key corresponding to that particular DRCpub. In step 3110, the DRC 1910 decrypts EDRFC 2722 to obtain DRFC 2714 and retrieves the ARI 2706 from the DRFC 2714 in step 3112. Finally, the DRC 1910, in step 3114, uses ARI 2706 to locate the corresponding AR (e.g., AR residing at the address ARI) and challenges the emergency decrypting user 1916 in step 3116.

Referring again to FIG. 28, if the emergency decrypting user 1916 fails to meet the challenge in step 2812, emergency access is denied in step 2814. If the emergency decrypting user 1916 meets the challenge in step 2812, the DRC 1910 sends the DRFC 2714 to the emergency decrypting user 1916 in step 2816. The emergency decrypting user 1916 receives the DRFC 2714 in step 2818 and extracts the US 2708 from the DRFC 2714 in step 2820.

In one embodiment, steps 2806 and 2820 are performed by the software which initially created the file and the DRF. In this embodiment, the location of the DRF within or alongside the file (or database record, or whatever item is encrypted) is under the control of some application software rather than the DRC 1910 or its encrypting user 1914.

In one embodiment, steps 2808 through 2818 are performed by the emergency decrypting user's 1916 software, to provide an easy, seamless interface to the DRC 1910. In a preferred embodiment, the emergency decrypting user's 1916 software writes the DRF to a file in step 2806 and retrieves the DRFC from a file in step 2820, allowing steps 2808 through 2814 to be performed by a separate application which is purely a DRC client.

According to one embodiment, steps 2808 and 2818 involve well known methods for providing secure transmission of information. The preferred embodiment uses symmetric encryption with a session key chosen at random by the emergency decrypting user 1916. That key is encrypted in DRCpub and communicated (along with a KI 2712 to identify the key used) to the DRC 1910 along with the encrypted message. That message includes a command to the DRC 1910 to use a given (randomly chosen) key for communications back to the emergency decrypting user 1916 in step 2818. In this manner, the emergency decrypting user 1916 does not need to cream a public key for key transmission purposes.

3.6.5 Challenge-Response Protocol

Figure 30:
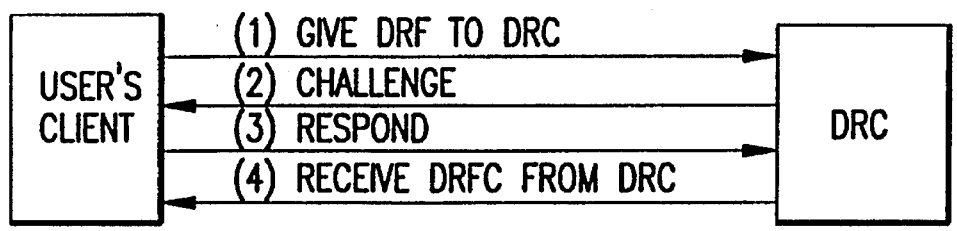
FIG. 30 is a data flow diagram depicting a challenge-response cycle embedded within an emergency access request.
Figure 29:
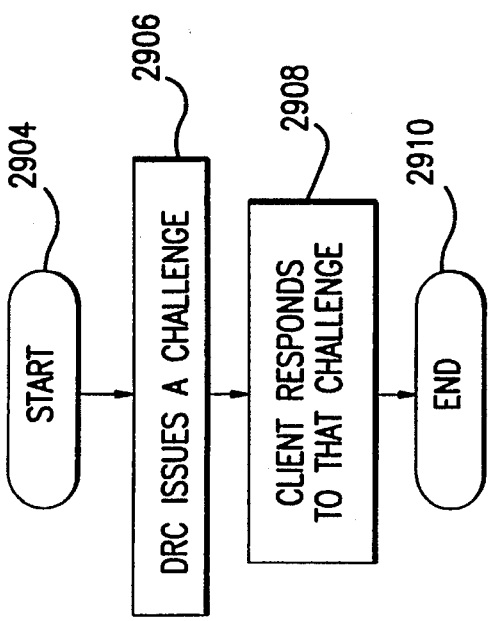
FIG. 29 is a flow chart of an exemplary challenge-response cycle.

The process of responding to challenges mirrors the nested structure of the relevant AR definition. FIG. 29 shows the challenge-response cycle. In step 2906, the DRC 1910 issues a challenge (which can be thought of as a remote-procedure-call [RPC]) and the AR defining user 1918 or emergency decrypting user 1916 responds to that challenge in step 2908. FIG. 30 shows this cycle as it pertains to an emergency access request.

If the ARI identifies an AR representing a simple authentication test, then the emergency decrypting user 1916 has all of the information to provide the correct response. However, if the ARI specifies an AR representing a group or indirect AR, then the emergency decrypting user 1916 needs to perform non-local work in order to get the correct response. This non-local work will involve further nested RPCs. If the ARI specifies an indirection, then the RPC is from one emergency decrypting user 1916 to another emergency decrypting user 1916. In various situations, the RPC could involve network communication or merely the hand-carrying of data on a floppy disk (e.g., if the indirection is for the purpose of physical authentication).

For every challenge issued by the DRC 1910, the DRC 1910 includes a Sequence token (SEQ). The SEQ is an encrypted datum which only the DRC 1910 can decrypt and which includes the recursive stack of challenges along with the transaction number and a strong checksum on the contents of the SEQ (to detect tampering). For example, if ARI=17 specifies a group of which ARI=5 is a member, the first Sequence token will list a recursion depth of 1 and the set [17] as the stack. The emergency decrypting user 1916 is then challenged with a group challenge that lists the members of the group. The decrypting user 1916 chooses one of these to satisfy first, for example 5, and recursively calls the DRC 1910 to challenge the emergency decrypting user 1916 to satisfy ARI=5. That recursive call includes the SEQ which the DRC 1910 provided with the group challenge. When the DRC 1910 performs the recursive RPC, calling the emergency decrypting user 1916 to satisfy ARI=5, that call will include a SEQ listing a recursion depth of 2 and a stack of [17,51].

In a preferred embodiment, there are two conditions under which the DRC 1910 issues a challenge to a emergency decrypting user 1916. In the first condition, the emergency decrypting user 1916 submits a DRF 2730 for emergency access. This submission includes no other information and starts a new transaction. If this challenge gets a correct response, the DRC 2730 returns the DRFC 2714.

In the second condition, tile emergency decrypting user 1916 submits a request to be challenged as part of fulfilling a group or indirection. This submission includes a SEQ identifying the transaction and recursive stack of which this recursive challenge is a part. The emergency decrypting user 1916 submitting that request need not be the same emergency decrypting user 1916 who submitted the DRF 2730 which started this transaction. If this challenge gets a correct response, the DRC 1910 returns a SUCCESS token which includes the same information as the SEQ along with tile fact of success.

In response to a simple challenge (a prompt/reply or a digital signature, for example), the emergency decrypting user 1916 replies with the SEQ and the correct response. In return, the DRC 1910 provides either the DRFC 2714 or a SUCCESS token.

In response to a group or indirect challenge, the emergency decrypting user 1916 provides one or more SUCCESS tokens which the DRC 1910 verifies as being part of this transaction and as correctly satisfying the group or indirect AR. In return, the DRC 1910 provides either the DRFC 2714 or a SUCCESS token.

In addition, in a preferred embodiment, to keep from having either the DRC 1910 or the emergency decrypting user 1916 maintain state (i.e., the contents of all variables which will be used by the computer program issuing the RPC between getting the answer from the RPC and returning to the program's caller) across RPCs, the DRC 1910 includes a state token with every RPC it initiates and the emergency decrypting user 1916 includes a state token with every RPC it initiates. The responder to the RPC returns that token, if any, with its response. Those tokens are encrypted in a key known only to the originator and include information to permit the originator to verify that the token goes with the SEQ with which it is accompanied.

As a result, the state of the DRC 1910 and emergency decrypting user 1916 are maintained over this recursive set of RPCs in which the identity of the caller keeps changing hands.

3.6. 6 Receipt and Use of the DRFC

As mentioned above, the successful completion of an emergency access request is the return of a DRFC 2714 to the emergency decrypting user 1916. The purpose of the challenge-response is to verify that the emergency decrypting user 1916 making the request is authorized to receive the DRFC 2714. Since the DRFC 2714 comprises an ARI 2706 by the AR defining user 1918, any subsequent emergency decrypting user 1916 who can satisfy that AR 2706 has, presumably, been granted authority by the AR defining user 1918 to have access.

Once the DRFC 2714 is returned to the emergency decrypting user 1916, the emergency decrypting user's 1916 software has the responsibility for using the DRFC 2714 to provide access to the file (i.e., for extracting the US 2708 from the DRFC 2714, and perhaps for using the US 2708 to decrypt other data). Again, it should be noted that in other applications, the DRFC 2714 itself could be the information desired (e.g., a safe combination). In this case there is nothing extensive needed in the software which receives the DRFC 2714.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A controller for enabling a processor to process a request from an emergency decrypting user to gain access to user secret data in a data recovery field, the data recovery field comprising the user secret data and an access rule index encrypted using a data recovery center public key, wherein emergency decrypting comprises decryption using the data recovery fields, said access rule index allowing the data recovery center to locate an access rule, the access rule defining at least a portion of a procedure for authenticating a party's identity, wherein the access rule includes an authentication test or a compound authorization rule, the controller comprising:

means for enabling said processor to transfer said data recovery field to a data recovery center, wherein said data recovery center decrypts encrypted user secret data and access rule index using a data recovery center private key, and wherein said data recovery center uses said decrypted access rule index to obtain an access rule from a storage device coupled to said data recovery center;

means for enabling said processor to receive from said data recovery center at least one challenge as defined at least partially by said access rule;

means for enabling said processor to communicate to said data recovery center a response to each of said at least one challenge; and means for enabling said processor to receive from said data recovery center said decrypted user secret data if said at least one challenge was correctly answered as defined at least partially by said access rule.

2. The controller of claim 1, wherein said data recovery field is of the form KI|[ARI|KS]DRCpub, wherein KI is a key identifier that uniquely identifies DRCpub.

3. The controller of claim 1, wherein said data recovery field is of the form:

$[ARI_1|KS_1]DRCpub_1, [ARI_2|KS_2]DRCpub_2, \ldots, [ARI_n|KS_n]DRCpub_n,$ wherein $KS_1, KS_2, \ldots, KS_n$ are shares of a secret key.

4. The controller of claim 1, wherein said access rule is an authentication test that verifies a user's identity.

5. The controller of claim 1, wherein said access rule comprises N prompt/reply pairs, said access rule defining user specifying the numbers A and K ($K \leq A \leq N$) such that said access rule definition is satisfied if a user correctly responds to K of the A prompt/reply pairs that said data recovery center randomly selects.

6. The controller of claim 1, wherein said access rule is a compound authorization rule of the form [n, k, ARI1, ARI2, ..., ARIn], $k \leq n$, such that said access rule definition is satisfied if k of the n ARIs are satisfied.

7. The controller of claim 1, wherein said access rule index is an address at which said access rule definition is stored.

8. A method for controlling an emergency decrypting user's access to a file encrypted by a file encrypting user with a storage key, wherein emergency decypting comprises decryption using a data recovery field, access to the file being controlled by an access rule, wherein the access rule includes an authentication test or a compound authorization rule, comprising the steps of:

(1) defining by an access rule defining user an access rule to control access to a storage key and sending said access rule to a data recovery center;

(2) returning an access rule index by said data recovery center to said access rule defining user, wherein said access rule index allows said data recovery center to locate said access rule;

(3) retrieving said access rule index by a file encrypting user and generating a data recovery field, said data recovery field comprising said access rule index and said storage key encrypted by a data recovery center public key;

(4) attaching by the file encrypting user said data recovery field to an encrypted file;

(5) extracting by an emergency decrypting user said data recovery field and sending said data recovery field to said data recovery center;

(6) presenting by said data recovery center to said emergency decrypting user a challenge using said access rule referenced by said access rule index in said data recovery field; and (7) sending said storage key by said data recovery center to said emergency decrypting user if said emergency decrypting user meets said challenge.

9. A method for controlling an emergency decrypting user's access to a secret encrypted by a file encrypting user in a data recovery field, wherein emergency decrypting comprises decryption using a data recovery field, access to the message being controlled by an access rule, wherein the access rule includes an authentication test or a compound authorization rule, comprising the steps of:

(1) defining by an access rule defining user an access rule to control access to a secret and sending said access rule to a data recovery center;

(2) returning by said data recovery center to said access rule defining user an access rule index, wherein said access rule index allows said data recovery center to locate said access rule;

(3) retrieving said access rule index by a file encrypting user and generating said data recovery field, said data recovery field comprising said access rule index and said secret encrypted by a data recovery center public key;

(4) sending said data recovery field by said emergency decrypting user to said data recovery center;

(5) presenting a challenge by said data recovery center to said emergency decrypting user using said access rule referenced by said access rule index in said data recovery field; and (6) sending said secret by said data recovery center to said emergency decrypting user if said emergency decrypting user meets said challenge.

10. A method for a data recovery center to control access by an emergency decrypting user to a file encrypted with a storage key, wherein emergency decrypting comprises decryption using a data recovery field, the data recovery field comprising the storage key and an access rule index encrypted with a data recovery center public key, wherein an access rule referenced by the access rule index includes an authentication test or a compound authorization rule, the method comprising the steps of:

(1) receiving a data recovery field from an emergency decrypting user requesting access to a storage key encrypted in said data recovery field;

(2) challenging said emergency decrypting user with an access rule referenced by an access rule index in said received data recovery field; and (3) sending said storage key to said emergency decrypting user if said emergency decrypting user successfully meets said data recovery center's challenge.

11. The method of claim 10, wherein said step (1) comprises the step of receiving a data recovery field that is of the form KI|[ARI|KS]DRCpub, wherein KI is a key identifier that uniquely identifies DRCpub.

12. The method of claim 10, wherein said step (1) comprises the step of receiving a data recovery field that is of the form:

[ARI$_1$|KS$_1$]DRCpub$_1$, [ARI$_2$|KS$_2$]DRCpub$_2$, . . . , [ARI$_n$|KS$_n$]DRCpub$_n$, wherein KS$_1$, KS$_2$, . . . , KS$_n$ are shares of a secret key.

13. The method of claim 10, wherein said step (2) comprises the step of challenging said emergency decrypting user with an authentication test that verifies a user's identity.

14. The method of claim 10, wherein said step (2) comprises the step of challenging said emergency decrypting user with an access rule that comprises N prompt/reply pairs, wherein an access rule defining user specifies the numbers A and K (K≦A≦N) such that said access rule is satisfied if a user correctly responds to K of the A prompt/reply pairs that said data recovery center randomly selects.

15. The method of claim 10, wherein said step (2) comprises the step of challenging said emergency decrypting user with an access rule of the form [n, k, ARI1, ARI2, . . . , ARIn], k≦n, such that said access rule is satisfied if k of the n access rule indexes are satisfied.

16. The method of claim 10, wherein said step (2) comprises the step of challenging said emergency decrypting user with an access rule is referenced by an address in said access rule index.

17. A method for a data recovery center to control access by an emergency decrypting user to a secret, wherein emergency decrypting comprises decryption using a data recovery field, the data recovery field comprising the secret and an access rule index encrypted with a data recovery center public key, wherein an access rule referenced by the access rule index includes an authentication test or a compound authorization rule, the method comprising the steps of:

(1) receiving a data recovery field from an emergency decrypting user requesting access to a secret encrypted in said data recovery field;

(2) challenging said emergency decrypting user with an access rule referenced by an access rule index in said received data recovery field; and (3) sending said secret to said emergency decrypting user if said emergency decrypting user successfully meets said data recovery center's challenge.

18. The method of claim 17, wherein said step (1) comprises the step of receiving a data recovery field that is of the form KI|[ARI|US]DRCpub, wherein KI is a key identifier that uniquely identifies DRCpub.

19. The method of claim 17, wherein said step (1) comprises the step of receiving a data recovery field that is of the form:

[ARI$_1$|US$_1$]DRCpub$_1$, [ARI$_2$|US$_2$]DRCpub$_2$, . . . , [ARI$_n$|US$_n$]DRCpub$_n$, wherein US$_1$, US$_2$, . . . , US$_n$ are shares of a secret.

20. The method of claim 17, wherein said step (2) comprises the step of challenging said emergency decrypting user with an authentication test that verifies a user's identity.

21. The method of claim 17, wherein said step (2) comprises the step of challenging said emergency decrypting user with an access rule that comprises N prompt/reply pairs, wherein an access rule defining user specifies the numbers A and K (K≦A≦N) such that said access rule is satisfied if a user correctly responds to K of the A prompt/reply pairs that said data recovery center randomly selects.

22. The method of claim 17, wherein said step (2) comprises the step of challenging said emergency decrypting user with an access rule of the form [n, k, ARI1, ARI2, . . . , ARIn], k≦n, such that said access rule is satisfied if k of the n access rule indexes are satisfied.

23. The method of claim 17, wherein said step (2) comprises the step of challenging said emergency decrypting user with an access rule is referenced by an address in said access rule index.

24. A method for an emergency decrypting user to gain access to a storage key used to encrypt a file, the encrypted file stored with a data recovery field, wherein emergency decrypting comprises decryption using a data recovery field, the data recovery field comprising an access rule index and the storage key encrypted by a data recovery center public key, the access rule index allowing the data recovery center to locate the access rule, wherein the access rule includes an authentication test or a compound authorization rule, the method comprising the steps of:

(1) extracting a data recovery field;

(2) sending said data recovery field to a data recovery center;

(3) meeting a challenge from said data recovery center, said challenge based on an access rule referenced by an access rule index in said data recovery field; and (4) receiving a storage key from said data recovery center if said challenge is successfully met.

25. The method of claim 24, wherein said step (2) comprises the step of sending a data recovery field that is of the form KI|[ARI|KS]DRCpub, wherein KI is a key identifier that uniquely identifies DRCpub.

26. The method of claim 24, wherein said step (2) comprises the step of sending a data recovery field that is of the form:

[ARI$_1$|KS$_1$]DRCpub$_1$, [ARI$_2$|KS$_2$]DRCpub$_2$, . . . , [ARI$_n$|KS$_n$]DRCpub$_n$, wherein KS$_1$, KS$_2$, . . . , KS$_n$ are shares of a secret key.

27. The method of claim 24, wherein said step (3) comprises the step of satisfying an authentication test that requires verification of a user's identity.

28. The method of claim 24, wherein said step (3) comprises the step of satisfying an access rule that comprises N prompt/reply pairs, wherein an access rule defining user specifies the numbers A and K (K≦A≦N) such that said access rule is satisfied if a user correctly responds to K of the A prompt/reply pairs that said data recovery center randomly selects.

29. The method of claim 24, wherein said step (3) comprises the step of satisfying an access rule of the form [n, k, ARI1, ARI2, . . . , ARIn], k≦n, such that said access rule is satisfied if k of the n access rule indexes are satisfied.

30. The method of claim 24, wherein said step (3) comprises the step of satisfying an access rule that is referenced by an address in said access rule index.

31. A method for an emergency decrypting user to gain access to a secret that is stored in a data recovery field, wherein emergency decrypting comprises decryption using the data recovery field, the data recovery field comprising an access rule index and the secret encrypted by a data recovery center public key, the access rule index allowing the data recovery center to locate the access rule, wherein the access rule includes an authentication test or a compound authorization rule, the method comprising the steps of:

(1) sending a data recovery field to a data recovery center;

(2) meeting a challenge from said data recovery center, said challenge based on an access rule referenced by an access rule index in said data recovery field; and (3) receiving a secret from said data recovery center if said challenge is successfully met.

32. The method of claim 31, wherein said step (1) comprises the step of sending a data recovery field that is of the form KI|[ARI|US]DRCpub, wherein KI is a key identifier that uniquely identifies DRCpub.

33. The method of claim 31, wherein said step (1) comprises the step of sending a data recovery field that is of the form:

[ARI$_1$|US$_1$]DRCpub$_1$, [ARI$_2$|US$_2$]DRCpub$_2$, . . . , [ARI$_n$|US$_n$]DRCpub$_n$, wherein US$_1$, US$_2$, . . . , US$_n$ are shares of a secret.

34. The method of claim 31, wherein said step (2) comprises the step of satisfying an authentication test that requires verification of a user's identity.

35. The method of claim 31, wherein said step (2) comprises the step of satisfying an access rule that comprises N prompt/reply pairs, wherein an access rule defining user specifies the numbers A and K (K≦A≦N) such that said access rule is satisfied if a user correctly responds to K of the A prompt/reply pairs that said data recovery center randomly selects.

36. The method of claim 31, wherein said step (2) comprises the step of satisfying an access rule of the form [n, k, ARI1, ARI2, . . . , ARIn], k≦n, such that said access rule is satisfied if k of the n access rule indexes are satisfied.

37. The method of claim 31, wherein said step (2) comprises the step of satisfying an access rule that is referenced by an address in said access rule index.

38. A system for controlling access to a file that is encrypted with a storage key, the system comprising:

a data recovery center for storing at least one access rule, wherein an access rule includes an authentication test or a compound authorization rule;

an access rule defining user that defines an access rule to control access to a storage key, said access rule defining user registering said access rule with said data recovery center, said data recovery center returning an access rule index that said access rule defining user stores in an access rule index file;

a file encrypting user that attaches a data recovery field to an encrypted file, wherein said data recovery field comprises an access rule index retrieved from said access rule index file and said storage key encrypted by a data recovery center public key; and an emergency decrypting user that initiates an emergency decryption process that comprises decryption using said data recovery field, said emergency decrypting user sending said data recovery field to said data recovery center and receiving said storage key if a challenge defined by said access rule referenced by said access rule index in said data recovery field is satisfied.

39. A system for controlling access to user secret data, the system comprising:

a data recovery center for storing at least one access rule, wherein an access rule includes an authentication test or a compound authorization rule;

an access rule defining user that defines an access rule to control access to a user secret data, said access rule defining user registering said access rule with said data recovery center, wherein said data recovery center returns an access rule index that said access rule defining user stores in an access rule index file;

a file encrypting user that creates a data recovery field, wherein said data recovery field comprises said access rule index retrieved from said access rule index file and said user secret data encrypted by a data recovery center public key; and an emergency decrypting user that initiates an emergency decryption process that comprises decryption using said data recovery field, said emergency decrypting user sending said data recovery field to said data recovery center and receiving said user secret data if a challenge defined by said access rule referenced by said access rule index in said data recovery field is satisfied.

40. A data recovery center to control access by an emergency decrypting user to a user secret, wherein emergency decryption comprises decryption using a data recovery field that includes the user secret data and an access rule index encrypted with a data recovery center public key, the access rule index referencing an access rule that includes an authentication test or a compound authorization rule, the data recovery center comprising:

means for receiving a data recovery field from an emergency decrypting user requesting access to a user secret encrypted in a data recovery field;

means for challenging said emergency decrypting user with an access rule referenced by an access rule index in said received data recovery field; and means for sending said user secret to said emergency decrypting user if said emergency decrypting user successfully meets the data recovery center's challenge.

41. The data recovery center of claim 40, wherein said data recovery field is of the form KI|[ARI|US]DRCpub, wherein KI is a key identifier that uniquely identifies DRCpub.

42. The dam recovery center of claim 40, wherein said data recovery field is of the form:

[ARI$_1$|US$_1$]DRCpub$_1$,[ARI$_2$|US$_2$]DRCpub$_2$, . . . , ARI$_n$|US$_n$]DRCpub$_n$, wherein US$_1$, US$_2$, . . . , US$_n$ are shares of a secret.

43. The data recovery center of claim 40, wherein said access rule is an authentication test that verifies a user's identity.

44. The data recovery center of claim 40, wherein said access rule comprises N prompt/reply pairs, said access rule defining user specifying the numbers A and K (K≤A≤N) such that said access rule definition is satisfied if a user correctly responds to K of the A prompt/reply pairs that the data recovery center randomly selects.

45. The data recovery center of claim 40, wherein said access rule is a compound authorization rule of the form [n, k, ARI1, ARI2, . . . , ARIn], k≤n, such that said access rule definition is satisfied if k of the n ARIs are satisfied.

46. The data recovery center of claim 40, wherein said access rule index is an address at which said access rule definition is stored.

47. The data recovery center of claim 40, wherein said user secret is a storage key used to encrypt a file.

48. An access rule defining user that registers, with a data recovery center, an access rule that controls an emergency decrypter's access to a user secret, wherein the access rule includes an authentication test or a compound authorization rule, wherein emergency decryption comprises decryption using a data recovery field that includes the user secret and an access rule index encrypted with a data recovery center public key, the access rule defining user comprising:

means for defining an access rule to control access to a user secret;

means for sending said access rule to a data recovery center;

means for receiving from said data recovery center an access rule index that references said access rule; and means for storing said access rule index in an access rule index file.

49. The access rule defining user of claim 48, wherein said access rule is an authentication test that verifies a user's identity.

50. The access rule defining user of claim 48, wherein said access rule comprises N prompt/reply pairs, said access rule defining user specifying the numbers A and K (K≤A≤N) such that said access rule definition is satisfied if a user correctly responds to K of the A prompt/reply pairs that said data recovery center randomly selects.

51. The access rule defining user of claim 48, wherein said access rule is a compound authorization rule of the form [n, k, ARI1, ARI2, . . . , ARIn], k≤n, such that said access rule definition is satisfied if k of the n ARIs are satisfied.

52. The access rule defining user of claim 48, wherein said access rule index is an address at which said access rule definition is stored.

53. The access rule defining user of claim 48, wherein said user secret is a storage key used to encrypt a file.

54. A method for an access rule defining user to register an access rule with a data recovery center, the access rule controlling an emergency decrypter's access to a user secret, wherein the access rule includes an authentication test or a compound authorization rule, wherein emergency decryption comprises decryption using a data recovery field that includes the user secret and an access rule index encrypted with a data recovery center public key, the method comprising the steps of:

(1) defining a first access rule to control access to a user secret;

(2) sending said first access rule to a data recovery center;

(3) receiving from said data recovery center an access rule index that references said access rule;

(4) storing said access rule index in an access rule index file;

(5) sending a second access rule and said access rule index to said data recovery center, said access rule index referencing said first access rule that the access rule defining user desires to redefine with said second access rule; and (6) responding to a challenge presented by said data recovery center, said challenge based on said first access rule.

55. An emergency decrypting user that gains access to a storage key used to encrypt a file, the encrypted file stored with a data recovery field, the data recovery field comprises an access rule index and the storage key encrypted by a data recovery center public key, the access rule index allowing the data recovery center to locate the access rule, wherein the access rule includes an authentication test or a compound authorization rule, wherein emergency decrypting comprises decryption using the data recovery field, the emergency decrypting user comprising:

means for extracting a data recovery field;

means for sending said data recovery field to a data recovery center;

means for responding to a challenge from said data recovery center, said challenge based on an access rule referenced by said access rule index in said data recovery field; and means for receiving a storage key from said data recovery center if said challenge is successfully met.

56. The emergency decrypting user of claim 55, wherein said data recovery field is of the form KI|[ARI|KS]DRCpub, wherein KI is a key identifier that uniquely identifies DRCpub.

57. The emergency decrypting user of claim 55, wherein said data recovery field is of the form:

[ARI$_1$|KS$_1$]DRCpub$_1$,[ARI$_2$|KS$_2$]DRCpub$_2$, . . . , ARI$_n$|KS$_n$]DRCpub$_n$, wherein $KS_1, KS_2, \ldots, KS_n$ are shares of a secret key.

58. The emergency decrypting user of claim 55, wherein said access rule is an authentication test that verifies a user's identity.

59. The controller of claim 55, wherein said access rule comprises N prompt/reply pairs, said access rule defining user specifying the numbers A and K ($K \leq A \leq N$) such that said access rule definition is satisfied if a user correctly responds to K of the A prompt/reply pairs that said data recovery center randomly selects.

60. The emergency decrypting user of claim 55, wherein said access rule is a compound authorization rule of the form [n, k, ARI1, ARI2, ..., ARIn], $k \leq n$, such that said access rule definition is satisfied if k of the n ARIs are satisfied.

61. The emergency decrypting user of claim 55, wherein said access rule index is an address at which said access rule definition is stored.

62. An emergency decrypting user that gains access to a user secret, the user secret data being stored in a data recovery field, the data recovery field comprising an access rule index and the user secret data encrypted by a data recovery center public key, the access rule index allowing the data recovery center to locate the access rule, wherein the access rule includes an authentication test or a compound authorization rule, wherein emergency decrypting comprises decryption using the data recovery field, the emergency decrypting user comprising:

means for sending a data recovery field to a data recovery center;

means for responding to a challenge from said data recovery center, said challenge based on an access rule referenced by an access rule index in said data recovery field; and means for receiving user secret data from said data recovery center if said challenge is successfully met.

63. The emergency decrypting user of claim 62, wherein said data recovery field is of the form KI|[ARI|US]DRCpub, wherein KI is a key identifier that uniquely identifies DRCpub.

64. The emergency decrypting user of claim 62, wherein said data recovery field is of the form:

$[ARI_1|US_1]DRCpub_1, [ARI_2|US_2]DRCpub_2, \ldots, ARI_n|US_n]DRCpub_n$, wherein $US_1, US_2, \ldots, US_n$ are shares of a secret.

65. The emergency decrypting user of claim 62, wherein said access rule is an authentication test that verifies a user's identity.

66. The emergency decrypting user of claim 62, wherein said access rule comprises N prompt/reply pairs, said access rule defining user specifying the numbers A and K ($K \leq A \leq N$) such that said access rule definition is satisfied if a user correctly responds to K of the A prompt/reply pairs that the data recovery center randomly selects.

67. The emergency decrypting user of claim 62, wherein said access rule is a compound authorization rule of the form [n, k, ARI1, ARI2, ..., ARIn], $k \leq n$, such that said access rule definition is satisfied if k of the n ARIs are satisfied.

68. The data recovery center of claim 62, wherein said access rule index is an address at which said access rule definition is stored.

* * * * *